United States Patent
Pogue et al.

(10) Patent No.: US 11,089,183 B1
(45) Date of Patent: Aug. 10, 2021

(54) MULTIPLE DEVICE AUDIO-VIDEO SYNCHRONIZATION

(71) Applicant: Amazon Technologies, Inc., Seattle, WA (US)

(72) Inventors: Michael Alan Pogue, Sunnyvale, CA (US); Shao-Cheng Wang, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 171 days.

(21) Appl. No.: 16/546,245

(22) Filed: Aug. 20, 2019

(51) Int. Cl.
*H04N 21/4425* (2011.01)
*H04N 21/6375* (2011.01)
*H04N 21/647* (2011.01)
*H04N 5/04* (2006.01)
*H04N 21/439* (2011.01)
*H04N 21/43* (2011.01)

(52) U.S. Cl.
CPC .......... *H04N 5/04* (2013.01); *H04N 21/4307* (2013.01); *H04N 21/4392* (2013.01)

(58) Field of Classification Search
None
See application file for complete search history.

(56) References Cited

U.S. PATENT DOCUMENTS

| 8,752,102 B2* | 6/2014 | Menn | H04N 7/163 725/93 |
| 2008/0189412 A1* | 8/2008 | Wang | H04L 43/065 709/224 |
| 2009/0103892 A1* | 4/2009 | Hirayama | H04N 9/8042 386/240 |
| 2009/0245249 A1* | 10/2009 | Suzuki | H04L 12/18 370/390 |
| 2014/0146695 A1* | 5/2014 | Kim | H04L 65/80 370/252 |

\* cited by examiner

*Primary Examiner* — Brian T Pendleton
*Assistant Examiner* — Jean D Saint Cyr
(74) *Attorney, Agent, or Firm* — Lee & Hayes, P.C.

(57) ABSTRACT

Systems and methods for adaptive information packet transmission are disclosed. For example, one or more backup packets may be generated for a given data packet and a packet-spacing value and/or packet-sending order may be determined based at least in part on packet-loss data and/or other factors. The data packets and backup packets may be sent according to the packet-spacing value and packet-sending order, and feedback data may be provided by the receiving device. The feedback data may be utilized by the sending device to adapt the packet transmission parameters.

20 Claims, 11 Drawing Sheets

FIG. 4A

| | | | | | | | | | | | | |
|---|---|---|---|---|---|---|---|---|---|---|---|---|
| Config. 1 | M1a | M1b | B0a | B0b | M2a | M2b | B1a | B1b | M3a | M3b | B2a | B2b |
| Config. 2 | M1a | M1b | B-1a | B-1b | M2a | M2b | B0a | B0b | M3a | M3b | B1a | B1b |

FIG. 4B

| | | | | | | | | | | | | |
|---|---|---|---|---|---|---|---|---|---|---|---|---|
| Config. 3 | M1 | M1 | B-1 | B0 | B1 | M2 | B2 | M3 | B0 | B-1 | B1 | B0 |
| Config. 4 | M1 | M1 | B-1 | B0 | B-1 | M2 | B0 | M3 | B0 | B1 | B1 | B2 |
| Config. 5 | M1 | M1 | x | x | x | M2 | x | M3 | x | x | x | x |
| Config. 6 | M1 | M1 | B0 | x | x | M2 | x | M3 | B1 | x | B2 | x |
| Config. 7 | M1 | M1 | B-1 | x | x | M2 | x | M3 | B0 | x | B1 | x |

FIG. 4C

| | | | | | | | | | | | | |
|---|---|---|---|---|---|---|---|---|---|---|---|---|
| Config. 8 | M1 | M2 | B1 | B2 | M3 | B3 | M4 | B4 | M5 | B4 | M6 | B5 |
| Config. 9 | M1 | M2 | B0 | B1 | M3 | B2 | M4 | B3 | M5 | B3 | M6 | B4 |
| Config. 10 | M1 | M2 | B-1 | B0 | M3 | B1 | M4 | B2 | M5 | B2 | M6 | B3 |
| Config. 11 | M1 | M2 | x | x | M3 | x | M4 | x | M5 | x | M6 | x |

FIG. 4D

| | | | | | | | | | | | | | | | | |
|---|---|---|---|---|---|---|---|---|---|---|---|---|---|---|---|---|
| Config. 12 | M1 | B0 | M2 | B1 | M3 | B2 | M4 | B3 | M5 | B4 | M6 | B5 | M7 | B6 | M8 | B7 |
| Config. 13 | M1 | B0 | M2 | B1 | M3 | B2 | M4 | B3 | M5 | B4 | M6 | B5 | M7 | B6 | M8 | B7 |

| Parity Config. 1 | M1 | M2 | P12 | M3 | M4 | P34 | M5 | M6 | P56 | M7 | M8 | P78 | ... |
| --- | --- | --- | --- | --- | --- | --- | --- | --- | --- | --- | --- | --- | --- |
| Parity Config. 2 | M1 | M2 | M3 | M4 | P1-4 | M5 | M6 | M7 | M8 | P5-8 | M9 | M10 | ... |
| Parity Config. 3 | M1 | M2 | M3 | M4 | M5 | M6 | M7 | M8 | P1-8 | M9 | M10 | M11 | ... |

FIG. 5

MULTIPLE DEVICE AUDIO-VIDEO SYNCHRONIZATION

BACKGROUND

Information and/or data packets may be transmitted between devices utilizing multiple protocols. Some data packets may be lost during transmission. Described herein are improvements in technology and solutions to technical problems that can be used to, among other things, assist in packet transmission between devices.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIGS. 4A-D illustrate conceptual diagrams of example packet-sending configurations for multiple device audio-video synchronization.

FIG. 5 illustrates a conceptual diagram of additional example packet-sending configurations for multiple device audio-video synchronization.

DETAILED DESCRIPTION

Figure 1:
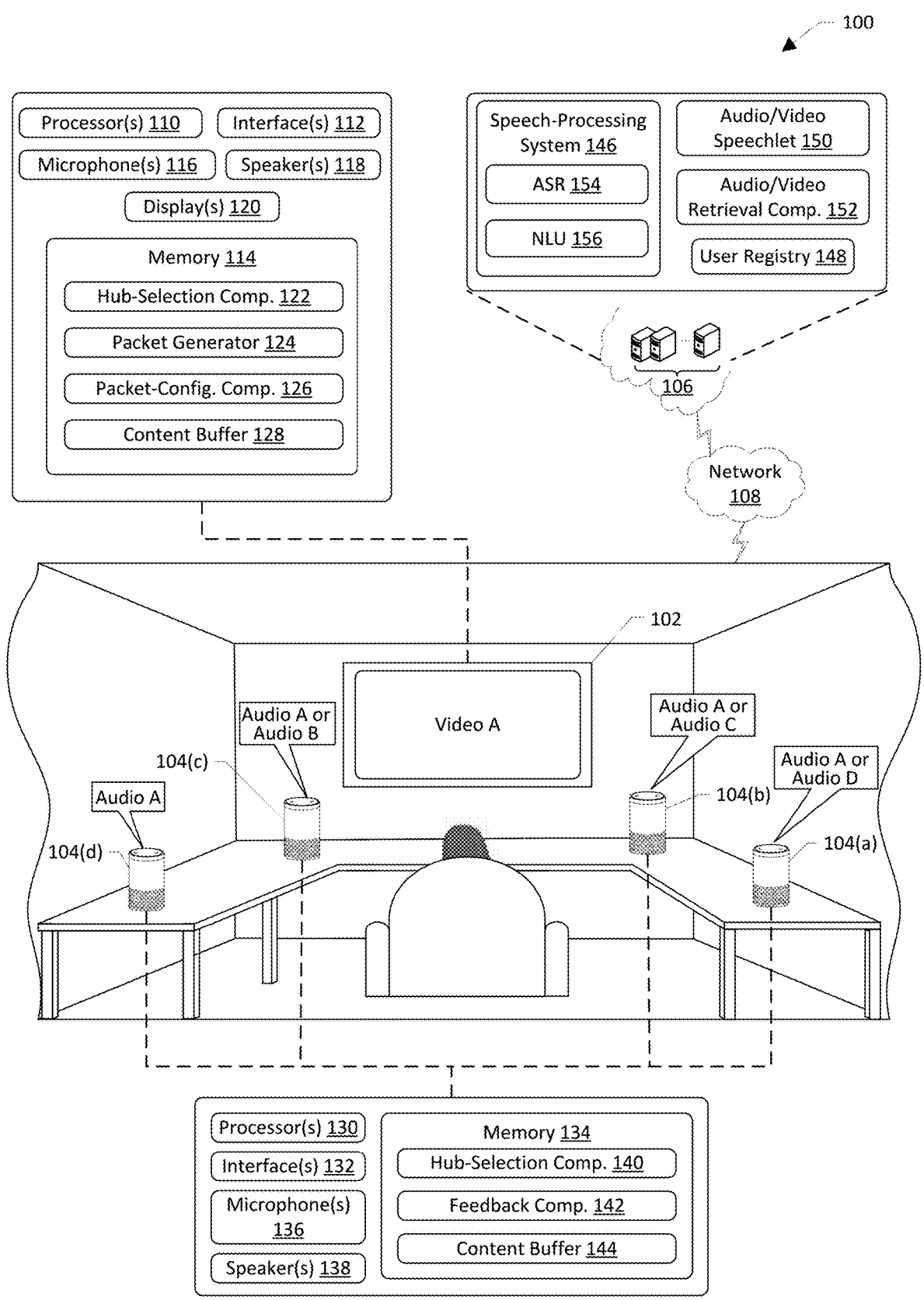
FIG. 1 illustrates a schematic diagram of an example environment for multiple device audio-video synchronization.

Systems and methods for adaptive information packet transmission are disclosed. Take, for example, an environment such as a home that may include numerous electronic devices. Some of those devices may be configured with functionality such as displays for displaying images and/or video and/or speakers for outputting audio. In some examples, a given electronic device may be configured to display images and/or video while one or more other electronic devices may be configured to output audio. For example, a television and/or other content-providing device in communication with a television may be configured to display video content while one or more speaker devices may be positioned within the environment of the television and may be configured to output audio associated with the video content. In these examples, it may be desirable to output the audio in a time-synchronous manner with display of the video and in a time-synchronous manner as between the speaker devices. However, packet transmission between devices may result in lost, out-of-order, and/or delayed packets being received by the speaker devices, which may cause increased latency in content output and/or may cause portions of content to be skipped or otherwise not output.

Some embodiments described herein provide for multiple device audio-video synchronization. For example, a user may request that content may be displayed and/or otherwise output utilizing devices located in a given environment. The request may be from user input to, for example, a personal device such as a mobile phone, tablet, and/or computer, and/or the request may be from a user utterance spoken by the user and captured by a microphone of one or more of the devices within the environment. For example, a user may provide input indicating an intent to play a video associated with a movie on a television within the environment while one or more other devices, such as audio-output devices, output audio corresponding to the movie. Input data corresponding to the input may be sent to, for example, a remote system configured to retrieve and/or otherwise send content associated with the request. In examples where the input comprises a user utterance, audio data corresponding to the user utterance may be sent to the remote system, which may determine an intent associated with the user utterance and utilize one or more speechlets to retrieve the requested content. The content, in this example includes image data corresponding to the video component of the movie and audio data corresponding to the audio component of the movie, may be sent from the remote system to a primary device within the environment. The primary device, in this example, may be the television. In other examples, the primary device may be selected based at least in part on one or more factors associated with the primary device and one or more secondary devices associated with the environment. Examples of these factors will be described in more detail with respect to FIGS. 10 and 11.

The primary device may receive the image data and the audio data and may send the audio data to the audio-output devices in the form of data packets. The primary device and or one or more other devices may establish a common time base such that when data packets are sent, those packets are sent with a time stamp that allows for correlation between data packets. The data packets may be sent from the primary device to the secondary devices in one stream to each secondary device and/or the packets may be sent in one multi-cast stream. While numerous protocols may be utilized for packet transmission, the User Datagram Protocol (UDP) may be utilized to quickly transmit the packets. UDP allows for the use of checksums for data integrity and may utilize port identifiers for addressing different functions at the source and destination of the datagram. Unlike some other protocols that may be used with some embodiments described herein, UDP may not have a guaranteed delivery of packets and the ordering of the packets may differ from the original order of packets for given content. As such, the data packets transmitted from the primary device to the secondary devices may be delayed, reordered, and/or lost during transmission. Embodiments discussed herein address, for example, packet loss using UDP for packet transmission.

For example, a given electronic device and/or group of electronic devices may be associated with certain packet-loss metrics that may indicate how frequently packets are lost when sent to that electronic device and/or a number of packets that are lost. By way of example, a given electronic device may be located in an area with other devices competing for bandwidth and/or with poor network connectivity. This example electronic device may historically have more frequent packet loss and/or may have more packets lost than another electronic device located in an area with fewer competing device and/or with better network connectivity. In still other examples, packet-loss data from one or more other devices having similar characteristics as a device at issue may be utilized to determine packet-loss metrics for the device at issue. For example, packet-loss data from devices within a given geographic area of the device at issue, and/or from devices with the same or a similar device type of the device at issue, and/or from devices with the same or similar components as components of the device at issue may be utilized.

The packet-loss data may be utilized to determine one or more parameters for backup packet generation and transmission. For example, the parameters may include a number of backup packets, which may be duplicates of data packets to be transmitted to a given device, to be generated, a type of backup packet to be generated, a packet-spacing value indicating when backup packets are to be sent, and/or an order of sending the backup packets in association with the data packets. By way of example, the number of backup packets to be generated and/or sent may be 1, 2, 3, 4, or more backup packets. The type of backup packet may be a full duplicate of a given data packet, a compressed and/or simplified version of a full duplicate of a given data packet, and/or a parity packet. The packet-spacing value may indicate that a backup packet is to be sent immediately following transmission of the corresponding data packet, one packet after transmission of the data packet, two packets after transmission of the data packet, and/or more than two packets after transmission of the data packet. The order for sending backup packets may indicate when backup packets are to be sent in association with each other.

By way of example, in instances where the packet-loss data indicates that a given secondary device frequently loses packets for short periods of time, a packet-configuration component of a primary device may cause one or two backup packets to be generated for each data packet and may identify a low packet-spacing value such that when data packets are lost their corresponding backup packets are received from the primary device quickly after sending of the data packets. In other examples where the packet-loss data indicates that a given secondary device infrequently loses packets for longer periods of time, the packet-configuration component may cause a small number of backup packets to be generated and may identify a higher packet-spacing value such that backup packets are sent after an anticipated packet-loss event concludes. By utilizing the processes and/or systems described herein, the amount of latency caused by the generation and sending of backup packets may be reduced while the resiliency to packet loss may be increased over static backup packet sending. In examples, the latency of packet sending may be 200 milliseconds or less when utilizing the processes and systems described herein.

Additionally, or alternatively, parity packets may be generated and utilized for adaptive information packet transmission. A parity packet may be generated utilizing two or more data packets and may represent, in a situation where there are two data packets used, either the first packet or the second packet. For example, the parity packet may be generated utilizing forward erasure coding. Forward erasure coding may utilize a forward error correction code that assumes bit erasures. The forward error correction code may transform a message with a certain number of symbols, and/or the data associated with those packets, into a longer message with more symbols such that the original message can be recovered from a subset of those symbols. In these examples, a parity packet may use forward erasure coding on messages from multiple data packets to generate a representation of the messages from both data packets. A parity check and/or polynomial oversampling may be utilized to recover one or more packets that are lost as long as the remaining packets are received along with the parity packet. For example, if a parity packet that represents a first data packet and a second data packet is sent, the first data packet or the second data packet may be recovered utilizing the parity packet when either the first data packet or the second data packet is lost and the parity packet is received. The parity packet may not be utilized to recover a lost packet if both the first data packet and the second data packet are lost. By utilizing parity packets instead of duplicate backup packets, the number of packets sent is decreased, which decreases bandwidth of packet transmission. The number of packets utilized to generate a parity packet may be static and/or may be dynamic and be based at least in part on historical packet-loss data indicating frequency of packet loss and/or a number of consecutive packets historically lost.

Additionally, or alternatively, utilizing the movie content example provided above, the primary device may identify, determine, and/or generate a delay value, such as 1 second, indicating a delay between when image data is received at the primary device and when display of corresponding images occurs. This delay may be utilized to allow for data packet transmission to the audio-output devices as well as reordering of packets at the audio-output device, as needed. In examples, the audio-output devices may send feedback data to the primary device indicating packet-loss information. The feedback data may be provided by the audio-output devices on the fly, and/or after packet transmission by the primary device. The feedback data may be utilized in one or more ways. For example, when the feedback data indicates that packet transmission is accomplished in less than the delay value, the delay value may be adjusted such that there is less delay between requesting display of content and display of that content. Additionally, when the feedback data indicates a change in the frequency of packet loss and/or the number of lost packets, the packet-configuration component may adjust the number of backup packets generated and/or may adjust the packet-spacing value for sending backup packets. In other examples, a content buffer associated with the secondary devices may be configured to buffer a certain amount of packets. When the feedback data indicates that the need for packet reordering is low and/or when packet loss decreases, a command may be sent from the primary device to the secondary device to decrease the amount of packets held in the content buffer.

Additionally, or alternatively, the feedback data may be utilized to determine whether to refrain from sending data packets from the primary device. For example, the feedback data may indicate that at least a threshold number of packets have been lost and/or have been consecutively lost. In these examples, one or more data packets may be removed from a packet queue and/or one or more data packets may be skipped by the primary device and not sent to the secondary device. By so doing, the primary device may refrain from sending data packets that, even if received by the secondary device, would be considered lost because they would be received after an amount of time allowable by the content buffer of the secondary device. By "skipping" packets, subsequent packets may be sent from the primary device sooner to assist in mitigating the consequences of lost packets at the secondary device.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example system 100 for multiple device audio-video synchronization. The system 100 may include, for example, multiple electronic devices. For purposes of this figure, one of the electronic devices may be described as the audio-distribution master device and/or the primary device 102 while the other electronic devices may be described as the audio-distribution slave devices or secondary devices 104(a)-(d). One or more of the electronic devices may be configured to receive user utterances and perform operations in response to such user utterances. In these examples, the devices may be "hands free" such that interactions with the devices are performed through audible requests and responses. The primary device 102 and/or the secondary devices 104(a)-(d) may be configured to send data to and/or receive data from a remote system 106, such as via a network 108. In examples, the primary device 102 and/or the secondary devices 104(a)-(d) may communicate directly with the system 106, via the network 108. In other examples, the primary device 102 may communicate with the remote system 106 and then provide data, such as data packets to the secondary devices 104(a)-(d). Additionally, it should be understood that a given space and/or environment may include numerous devices and need not include the same number and/or type of devices illustrated in FIG. 1. It should also be understood that when a "space" or "environment" is used herein, those terms mean an area and not necessarily a given room, building, or other structure, unless otherwise specifically described as such.

The primary device 102 may include one or more components, such as, for example, one or more processors 110, one or more network interfaces 112, memory 114, one or more microphones 116, one or more speakers 118, and/or one or more displays 120. The microphones 116 may be configured to capture audio, such as user utterances, and generate corresponding audio data. The speakers 118 may be configured to output audio, such as audio corresponding to audio data received from another device and/or the system 106. The displays 120 may be configured to present images corresponds to image data, such as image data received from another device and/or the system 106. It should be understood that while several examples used herein include a primary device 102 that allows users to interact therewith via user utterances, one or more other devices, which may not include a voice interface, may be utilized instead of or in addition to primary device 102. In these examples, the device may be configured to send and receive data over the network 108 and to communicate with other devices in the system 100. As such, in each instance where a primary device 102 is utilized, a computing device that does not include a voice interface may also or alternatively be used. The memory 114 may include one or more components such as, for example, a hub-selection component 122, a packet generator 124, a packet-configuration component 126, and/or a content buffer 128, which will be described in more detail below.

The secondary devices 104(a)-(d) may include components such as, for example, one or more processors 130, one or more network interfaces 132, memory 134, one or more microphones 136, and/or one or more speakers 138. The microphones 136 and/or the speakers 138 may perform the same or similar operations as the microphones 116 and/or the speakers 118 as described with respect to the primary device 102. The memory 134 may include one or more components, such as, for example, a hub-selection component 140, a feedback component 142, and/or a content buffer 144, which will be described in more detail below. It should be understood that when electronic devices are described herein, those electronic devices may include phones, computers, televisions, appliances, and/or other computing devices.

The remote system 106 may include components such as, for example, a speech-processing system 146, a user registry 148, an audio-video (A/V) speechlet 150, and/or an A/V retrieval component 152. It should be understood that while the speech-processing system 146 and the other components are depicted as separate from each other in FIG. 1, some or all of the components may be a part of the same system. The speech-processing system 146 may include an automatic speech recognition component (ASR) 154 and/or a natural language understanding component (NLU) 156. Each of the components described herein with respect to the remote system 106 may be associated with their own systems, which collectively may be referred to herein as the remote system 106, and/or some or all of the components may be associated with a single system. Additionally, the remote system 108 may include one or more applications, which may be described as skills. "Skills," as described herein may be applications and/or may be a subset of an application. For example, a skill may receive data representing an intent. For example, an intent may be determined by the NLU component 156 and/or as determined from user input via a computing device. Skills may be configured to utilize the intent to output data for input to a TTS component, a link or other resource locator for audio data, and/or a command to a device, such as the primary device 102.

In instances where a primary device 102 is utilized, skills may extend the functionality of accessory devices, including the secondary devices 104(a)-(d), that can be controlled by users utilizing a voice-user interface. In some examples, skills may be a type of application that may be useable in association with accessory devices and may have been developed specifically to work in connection with given accessory devices. Additionally, skills may be a type of application that may be useable in association with the voice-enabled device and may have been developed specifically to provide given functionality to the voice-enabled device. In examples, a non-skill application may be an application that does not include the functionality of a skill. Speechlets, as described herein, may be a type of application that may be usable in association with voice-enabled devices and may have been developed specifically to work in connection with voice interfaces of voice-enabled devices. The application(s) may be configured to cause processor(s) to receive information associated with interactions with the primary device 102. The application(s) may also be utilized, in examples, to receive input, such as from a user of a personal device and/or the primary device 102, and send data and/or instructions associated with the input to one or more other devices.

The components of the remote system 106 are described in detail below. In examples, some or each of the components of the remote system 106 may include their own processor(s), network interface(s), and/or memory. As such, by way of example, the speech-processing system 146 may include and/or be associated with processor(s), network interface(s), and/or memory. The A/V speechlet 150 and/or the A/V retrieval component 152 may include and/or be associated with different processor(s), network interface(s), and/or memory, or one or more of these components may utilize some or all of the same processor(s), network interface(s), and/or memory utilized by the speech-processing system 146. These components are described in detail below. Additionally, the operations and/or functionalities associated with and/or described with respect to the components of the remote system 106 may be performed utilizing cloud-based computing resources. For example, web-based systems such as Elastic Compute Cloud systems or similar systems may be utilized to generate and/or present a virtual computing environment for performance of some or all of the functionality described herein. Additionally, or alternatively, one or more systems that may be configured to perform operations without provisioning and/or managing servers, such as a Lambda system or similar system, may be utilized.

By way of example, a user may request that content may be displayed and/or otherwise output utilizing devices located in the environment. The request may be from user input to, for example, a personal device such as a mobile phone, tablet, and/or computer, and/or the request may be from a user utterance spoken by the user and captured by a microphone 118 of one or more of the devices 102, 104(*a*)-(*d*) within the environment. For example, a user may provide input indicating an intent to play a video associated with a movie on a television within the environment while one or more other devices, such as audio-output devices, output audio corresponding to the movie. Input data corresponding to the input may be sent to, for example, the remote system 106 configured to retrieve content associated with the request. In examples where the input comprises a user utterance, audio data corresponding to the user utterance may be sent to the remote system 106. The ASR component 154 of the speech-processing system 146 may generate text data corresponding to the audio data, and the NLU component 156 may generate intent data indicating an intent associated with the user utterance. In the example where the user utterance indicates an intent to output content on the one or more devices 102, 104(*a*)-(*d*), the A/V speechlet 150 may be utilized. The A/V speechlet 150 may receive the intent data and/or a payload associated with the intent data and may utilize that information to determine what content is to be provided to the primary device 102 for output. The A/V speechlet 150 may call the A/V retrieval component 152, which may include and/or have access to one or more databases and/or APIs with access to databases that may maintain A/V content. The A/V retrieval component 152 may retrieve the requested content may the remote system 106 may send the content to the primary device 102. The content, in a given example may include image data and audio data. In other examples, the content may include just image data, just audio data, and/or other types of data, such as text data. The primary device 102 depicted in FIG. 1 may be the television.

In other examples, the primary device 102 may be selected based at least in part on one or more factors associated with the primary device and one or more secondary devices associated with the environment. These factors will be described in more detail with respect to FIGS. 10 and 11. For example, the hub-selection component 122 may receive a message, from one or more of the secondary device 104(*a*)-(*d*) and/or the remote system 106, indicating that it is to act as the primary device 102 based on that device having a display 120 and/or as the device that received the input from the user and/or based on the device having more computing resources than other devices in the environment. The primary device 102 may send one or more messages to the secondary devices 104(*a*)-(*d*), and those messages may be received by the hub-selection component 140 of the secondary devices 104(*a*)-(*d*). Receipt of the messages may result in the secondary devices 104(*a*)-(*d*) enabling the content buffer 144 and/or the feedback component 142 and/or enabling receipt of data packets from the primary device 102.

The primary device 102 may receive the content data and may send all or a portion of the content data to the secondary devices 104(*a*)-(*d*). For example, the content data may include image data, which may be maintained at the primary device 102, and audio data, which may be sent to the secondary devices 104(*a*)-(*d*). In these examples, the audio data may be sent to the secondary devices 104(*a*)-(*d*) as data packets utilizing one or more protocols. While numerous protocols may be utilized for packet transmission, the User Datagram Protocol (UDP) may be utilized to quickly transmit the packets. UDP allows for the use of checksums for data integrity and may utilize port identifiers for addressing different functions at the source and destination of the datagram. Unlike some other protocols, UDP may not have a guaranteed delivery of packets and the ordering of the packets may differ from the original order of packets for given content. As such, the data packets transmitted from the primary device to the secondary devices may be delayed, reordered, and/or lost during transmission. For example, a packet may be considered delayed when it is received after an anticipated time but prior to when the packet is needed for output of content associated with the packet. A packet may be considered lost when it is not received at all or if the packet is received after when the packet is needed for output of content associated with the packet.

In examples, a given secondary device 104(*a*)-(*d*) and/or group of secondary devices 104(*a*)-(*d*) may be associated with certain packet-loss metrics that may indicate how frequently packets are lost when sent to that secondary device 104(*a*)-(*d*) and/or a number of packets that are lost. By way of example, a given secondary device 104(*a*)-(*d*) may be located in an area with other devices competing for bandwidth and/or with poor network connectivity. This example secondary device 104(*a*)-(*d*) may historically have more frequent packet loss and/or may have more packets lost than another electronic device located in an area with fewer competing device and/or with better network connectivity. In still other examples, packet-loss data from one or more other devices having similar characteristics as a secondary device 104(*a*)-(*d*) at issue may be utilized to determine packet-loss metrics for the device at issue. For example, packet-loss data from devices within a given geographic area of the device at issue, and/or from devices with the same or a similar device type of the device at issue, and/or from devices with the same or similar components as components of the device at issue may be utilized.

The packet-loss data may be utilized to determine one or more parameters for backup packet generation by the packet generator 124 and/or and packet transmission by the packet-configuration component 126. For example, the parameters may include a number of backup packets, which may be duplicates of data packets to be transmitted to a given device, to be generated, a type of backup packet to be generated by the packet generator 124. The parameters may also include a packet-spacing value indicating when backup packets are to be sent and/or an order of sending the backup packets in association with the data packets. By way of example, the number of backup packets to be generated and/or sent may be 1, 2, 3, 4, or more backup packets. The type of backup packet may be a full duplicate of a given data packet, a compressed and/or simplified version of a full duplicate of a given data packet, and/or a parity packet. The packet-spacing value may indicate that a backup packet is to be sent immediately following transmission of the corresponding data packet, one packet after transmission of the data packet, two packets after transmission of the data packet, and/or more than two packets after transmission of the data packet. The order for sending backup packets may indicate when backup packets are to be sent in association with each other.

By way of example, in instances where the packet-loss data indicates that a given secondary device 104(*a*)-(*d*) frequently loses packets for short periods of time, the packet generator 124 may generate one or two backup packets for each data packet, and the packet-configuration component 126 may identify a low packet-spacing value such that when data packets are lost their corresponding backup packets are received from the primary device 102 quickly after sending of the data packets. In other examples where the packet-loss data indicates that a given secondary device 104(*a*)-(*d*) infrequently loses packets for longer periods of time, the packet generator 124 may generate a small number of backup packets, and the packet-configuration component 126 may identifier a higher packet-spacing value such that backup packets are sent after an anticipated packet-loss event concludes. By utilizing the processes and/or systems described herein, the amount of latency caused by the generation and sending of backup packets may be reduced while the resiliency to packet loss may be increased.

Additionally, or alternatively, the packet generator 124 may generate parity packets, which may be utilized for adaptive information packet transmission. A parity packet may be generated utilizing two or more data packets and may represent, in a situation where there are two data packets used, the first packet and the second packet. For example, the parity packet may be generated utilizing forward erasure coding. Forward erasure coding may utilize a forward error correction code that assumes bit erasures. The forward error correction code may transform a message with a certain number of symbols, and/or the data associated with those packets, into a longer message with more symbols such that the original message can be recovered from a subset of those symbols. In these examples, a parity packet may use forward erasure coding on messages from multiple data packets to generate a representation of the messages from both data packets. A parity check and/or polynomial oversampling may be utilized to recover one or more packets that are lost as long as the remaining packets are received along with the parity packet. For example, if a parity packet that represents a first data packet and a second data packet is sent, the first data packet or the second data packet may be recovered utilizing the parity packet when either the first data packet or the second data packet is lost and the parity packet is received. The parity packet may not be utilized to recover a lost packet if both the first data packet and the second data packet are lost. By utilizing parity packets instead of duplicate backup packets, the number of packets sent is decreased, which decreases bandwidth of packet transmission. The number of packets utilized to generate a parity packet may be static and/or may be dynamic and be based at least in part on historical packet-loss data indicating frequency of packet loss and/or a number of consecutive packets historically lost.

Additionally, or alternatively, the primary device 102 may identify, determine, and/or generate a delay value, such as 1 second, indicating a delay between when content data is received at the primary device 102 and when display of corresponding content occurs. This delay may be utilized to allow for data packet transmission to the secondary devices 104(*a*)-(*d*) as well as reordering of packets at the secondary devices 104(*a*)-(*d*), as needed. In examples, the feedback component 142 of the secondary devices 104(*a*)-(*d*) may send feedback data to the primary device 102 indicating packet-loss information. The feedback data may be provided by the feedback component 142 on the fly, and/or after packet transmission by the primary device 102. The feedback data may be utilized in one or more ways. For example, when the feedback data indicates that packet transmission is accomplished in less than the delay value, the delay value may be adjusted such that there is less delay between requesting display of content and display of that content. Additionally, when the feedback data indicates a change in the frequency of packet loss and/or the number of lost packets, the packet-configuration component 126 may adjust the number of backup packets generated and/or may adjust the packet-spacing value for sending backup packets. In other examples, the content buffer 144 associated with the secondary devices 104(*a*)-(*d*) may be configured to buffer a certain amount of packets. When the feedback data indicates that the need for packet reordering is low and/or when packet loss decreases, a command may be sent from the primary device 102 to the secondary device 104(*a*)-(*d*) to decrease the amount of packets held in the content buffer. In other examples, the change to packet buffering may be initiated by the secondary device 104(*a*)-(*d*) and data indicating such a change may be sent to the primary device 102, such as utilizing the feedback component 142.

Additionally, or alternatively, the feedback data may be utilized to determine whether to refrain from sending data packets from the primary device 102. For example, the feedback data may indicate that at least a threshold number of packets have been lost and/or have been consecutively lost. In these examples, one or more data packets may be removed from the content buffer 128 and/or one or more data packets may be skipped by the primary device 102 and not sent to the secondary devices 104(*a*)-(*d*). By so doing, the primary device 102 may refrain from sending data packets that, even if received by the secondary devices 104(*a*)-(*d*), would be considered lost because they would be received after an amount of time allowable by the content buffer 144 of the secondary devices 104(*a*)-(*d*). By "skipping" packets, subsequent packets may be sent from the primary device 102 sooner to assist in mitigating the consequences of lost packets at the secondary devices 104(*a*)-(*d*).

Additionally, or alternatively, the feedback data may be utilized to determine when to discard packets at the secondary devices 104(a)-(d). For example, one or more of the secondary devices 104(a)-(d) may determine that one or more of the packets are late and/or will be late based at least in part on a lateness and/or a degree of lateness of previous packets and/or a number of lost packets. In these examples, even when the primary device 102 sends such packets that will be late and/or that will be late enough to be considered lost, when the secondary devices 104(a)-(d) receive those late packets, the secondary devices 104(a)-(d) may determine that such packets may be discarded and/or otherwise may refrain from decoding those packets. By so doing, subsequent packets may be utilized by the secondary devices 104(a)-(d) sooner to assist in mitigating the consequences of lost and/or late packets at the secondary devices 104(a)-(d).

As shown in FIG. 1, the primary device 102 may output images corresponding to image data received from the remote system 106. In FIG. 1, the images correspond to "Video A." The primary device 102 may also send audio-data packets representing audio associated with Video A to one or more of the secondary devices 104(a)-(d). In examples, the audio-data packets may include instances of the same audio data to be sent to the secondary device 104(a)-(d). For example, each of the secondary devices 104(a)-(d) may receive an instance of "Audio A" for output by the secondary devices 104(a)-(d). In other examples, some or each of the secondary devices 104(a)-(d) may receive differing audio data that is associated with Video A. For example, in a scenario where the secondary devices 104(a)-(d) are configured to output surround sound, the audio data sent to the secondary devices 104(a)-(d), while being associated with Video A, may differ from each other in one or more respects, such that when the secondary devices 104(a)-(d) output audio corresponding to the received audio data, a surround sound experience occurs.

The user registry component 148 may be configured to identify, determine, and/or generate associations between users, user accounts, and/or devices. For example, one or more associations between user accounts may be identified, determined, and/or generated by the user registry 148. The user registry 148 may additionally store information indicating one or more applications and/or resources accessible to and/or enabled for a given user account. Additionally, the user registry 148 may include information indicating device identifiers, such as naming identifiers, associated with a given user account, as well as device types associated with the device identifiers. The user registry 148 may also include information indicating user account identifiers, naming indicators of devices associated with user accounts, and/or associations between devices, such as the primary device 102 and/or the secondary devices 104(a)-(d). The user registry 148 may also include information associated with usage of the devices 102, 104(a)-(d). It should also be understood that a user account may be associated with one or more than one user profiles. It should also be understood that the term "user account" may be used to describe a set of data and/or functionalities associated with a given account identifier. For example, data identified, determined, and/or generated while using some or all of the system 100 may be stored or otherwise associated with an account identifier. Data associated with the user accounts may include, for example, account access information, historical usage data, device-association data, and/or preference data.

The speech-processing system 146 may be configured to receive audio data from the devices 102, 104(a)-(d) and/or other devices and perform speech-processing operations. For example, the ASR component 154 may be configured to generate text data corresponding to the audio data, and the NLU component 156 may be configured to generate intent data corresponding to the audio data. In examples, intent data may be generated that represents the audio data, such as without the generation and/or use of text data. The intent data may indicate a determined intent associated with the user utterance as well as a payload and/or value associated with the intent. For example, for a user utterance of "play Video A," the NLU component 156 may identify a "play" intent and the payload may be "Video A." In this example where the intent data indicates an intent to output content associated with "Video A," the speech-processing system 146 may call one or more speechlets, such as A/V speechlet 150, to effectuate the intent. Speechlets, as described herein may otherwise be described as applications and may include functionality for utilizing intent data to generate directives and/or instructions. For example, a communications speechlet may be called when the intent indicates that an action is to be performed associated with establishing a communication channel with another device. The speechlet may be designated as being configured to handle the intent of establishing a communication channel, for example. The speechlet may receive the intent data and/or other data associated with the user utterance from the NLU component 156, such as by an orchestrator of the remote system 106, and may perform operations to instruct the primary device 102 and/or the secondary devices 104(a)-(d) to perform an operation. For example, the A/V speechlet 150 may cause other components of the system 106 to retrieve requested content and send that content to one or more of the devices. The remote system 106 may generate audio data confirming that the request was received and/or that the content will be output, such as by a text-to-speech component.

It should be noted that while text data is described as a type of data utilized to communicate between various components of the remote system 106 and/or other systems and/or devices, the components of the remote system 106 may use any suitable format of data to communicate. For example, the data may be in a human-readable format, such as text data formatted as XML, SSML, and/or other markup language, or in a computer-readable format, such as binary, hexadecimal, etc., which may be converted to text data for display by one or more devices such as the voice-enabled device 102.

As shown in FIG. 1, several of the components of the remote system 106 and the associated functionality of those components as described herein may be performed by one or more of the primary device 102 and/or the secondary devices 104(a)-(d). Additionally, or alternatively, some or all of the components and/or functionalities associated with the primary device 102 and/or the secondary devices 104(a)-(d) may be performed by the remote system 106.

It should be noted that the exchange of data and/or other information as described herein may be performed only in situations where a user has provided consent for the exchange of such information. For example, upon setup of devices and/or other initiation of applications, a user may be provided with the opportunity to opt in and/or opt out of data exchanges between devices and/or for performance of the functionalities described herein. Additionally, when one of the devices is associated with a first user account and another of the devices is associated with a second user account, user consent may be obtained before performing some, any, or all of the operations and/or other processes described herein. Additionally, the operations performed by the components of the systems described herein may be performed only in situations where a user has provided consent for performance of the operations.

As used herein, a processor, such as processor(s) 110, 130, and/or the processor(s) described with respect to the components of the remote system 106, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 110, 130, and/or the processor(s) described with respect to the components of the remote system 106 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 110, 130, and/or the processor(s) described with respect to the components of the remote system 106 may possess its own local memory, which also may store program components, program data, and/or one or more operating systems.

The memory 114, 134, and/or the memory described with respect to the components of the remote system 106 may include volatile and nonvolatile memory, removable and non-removable media implemented in any method or technology for storage of information, such as computer-readable instructions, data structures, program component, or other data. Such memory 114, 134, and/or the memory described with respect to the components of the remote system 106 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 114, 134, and/or the memory described with respect to the components of the remote system 106 may be implemented as computer-readable storage media ("CRSM"), which may be any available physical media accessible by the processor(s) 110, 130, and/or the processor(s) described with respect to the remote system 106 to execute instructions stored on the memory 114, 134, and/or the memory described with respect to the components of the remote system 106. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 114, 134, and/or the memory described with respect to the components of the remote system 106, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Wash., USA; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

The network interface(s) 112, 132, and/or the network interface(s) described with respect to the components of the remote system 106 may enable messages between the components and/or devices shown in system 100 and/or with one or more other polling systems, as well as other networked devices. Such network interface(s) 112, 132, and/or the network interface(s) described with respect to the components of the remote system 106 may include one or more network interface controllers (NICs) or other types of transceiver devices to send and receive messages over the network 108.

For instance, each of the network interface(s) 112, 132, and/or the network interface(s) described with respect to the components of the remote system 106 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 112, 132, and/or the network interface(s) described with respect to the components of the remote system 106 may include a wide area network (WAN) component to enable message over a wide area network.

In some instances, the remote system 106 may be local to an environment associated the primary device 102 and/or the secondary devices 104(a)-(d). For instance, the remote system 106 may be located within one or more of the primary device 102 and/or the secondary devices 104(a)-(d). In some instances, some or all of the functionality of the remote system 106 may be performed by one or more of the primary device 102 and/or the secondary devices 104(a)-(d). Also, while various components of the remote system 108 have been labeled and named in this disclosure and each component has been described as being configured to cause the processor(s) to perform certain operations, it should be understood that the described operations may be performed by some or all of the components and/or other components not specifically illustrated.

Figure 2:
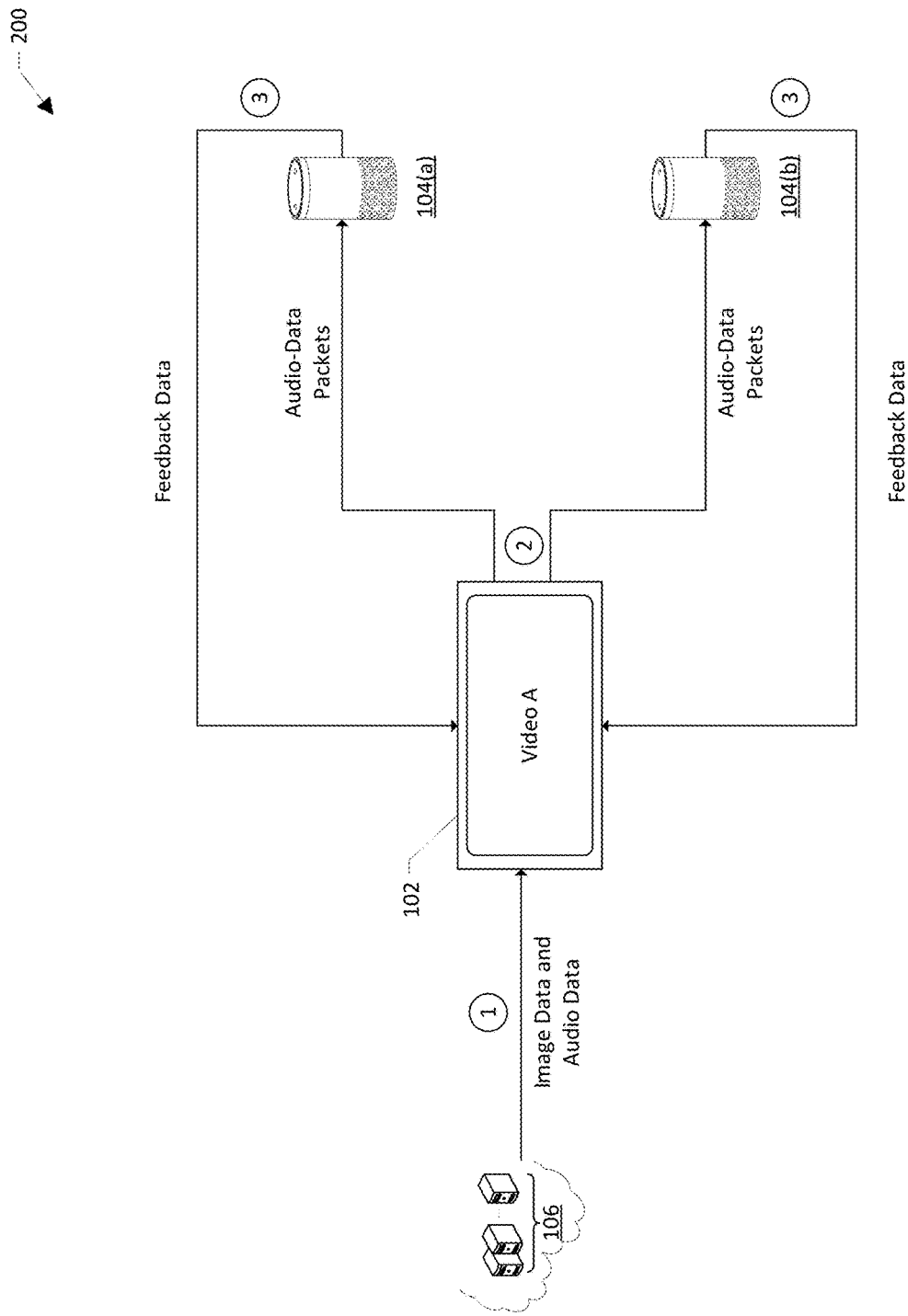
FIG. 2 illustrates a conceptual diagram of example components of a system for multiple device audio-video synchronization.

FIG. 2 illustrates a conceptual diagram of example components of a system 200 for multiple device audio-video synchronization. The system 200 may include at least some of the components of the system 100 from FIG. 1. For example, the system 200 may include a primary device 102, one or more secondary devices 104(a)-(b), and a remote system 106. FIG. 2 depicts the exchange of information and/or the performance of processes via the various components utilizing steps 1-3. However, it should be understood that the processes may be performed in any order and need not be performed in sequential order as depicted in FIG. 2.

At step 1, content data, such as image data and audio data, may be sent from the remote system 106 to the primary device 102. By way of example, a user may request that content may be displayed and/or otherwise output utilizing devices located in an environment. The request may be from a user input to, for example, a personal device such as a mobile phone, tablet, and/or computer, and/or the request may be from a user utterance spoken by the user and captured by a microphone of one or more of the devices 102, 104(*a*)-(*b*) within the environment. For example, a user may provide input indicating an intent to play a video associated with a movie on a television within the environment while one or more other devices, such as audio-output devices, output audio corresponding to the movie. Input data corresponding to the input may be sent to, for example, the remote system 106 configured to retrieve content associated with the request. In examples where the input comprises a user utterance, audio data corresponding to the user utterance may be sent to the remote system 106. The speech-processing system may generate intent data indicating an intent associated with the user utterance. In the example where the user utterance indicates an intent to output content on the one or more devices 102, 104(*a*)-(*b*), an A/V speechlet may receive the intent data and/or a payload associated with the intent data and may utilize that information to determine what content is to be provided to the primary device 102 for output. An A/V retrieval component may retrieve the requested content and the remote system 106 may send the content to the primary device 102. The content, in a given example may include image data and audio data. In other examples, the content may include just image data, just audio data, and/or other types of data, such as text data.

At step 2, the primary device 102 may send data packets, such as audio-data packets to the secondary devices 104(*a*)-(*b*). For example, the primary device 102 may receive the content data and may send all or a portion of the content data to the secondary devices 104(*a*)-(*b*). For example, the content data may include image data, which may be maintained at the primary device 102, and audio data, which may be sent to the secondary devices 104(*a*)-(*b*). In these examples, the audio data may be sent to the secondary devices 104(*a*)-(*b*) as data packets utilizing one or more protocols. While numerous protocols may be utilized for packet transmission, the User Datagram Protocol (UDP) may be utilized to quickly transmit the packets. UDP allows for the use of checksums for data integrity and may utilize port identifiers for addressing different functions at the source and destination of the datagram. Unlike some other protocols, UDP may not have a guaranteed delivery of packets and the ordering of the packets may differ from the original order of packets for given content. As such, the data packets transmitted from the primary device to the secondary devices may be delayed, reordered, and/or lost during transmission.

In examples, a given secondary device 104(*a*)-(*b*) and/or group of secondary devices 104(*a*)-(*b*) may be associated with certain packet-loss metrics that may indicate how frequently packets are lost when sent to that secondary device 104(*a*)-(*b*) and/or a number of packets that are lost. By way of example, a given secondary device 104(*a*)-(*b*) may be located in an area with other devices competing for bandwidth and/or with poor network connectivity. This example secondary device 104(*a*)-(*b*) may historically have more frequent packet loss and/or may have more packets lost than another electronic device located in an area with fewer competing device and/or with better network connectivity. In still other examples, packet-loss data from one or more other devices having similar characteristics as a secondary device 104(*a*)-(*b*) at issue may be utilized to determine packet-loss metrics for the device at issue. For example, packet-loss data from devices within a given geographic area of the device at issue, and/or from devices with the same or a similar device type of the device at issue, and/or from devices with the same or similar components as components of the device at issue may be utilized.

The packet-loss data may be utilized to determine one or more parameters for backup packet generation by a packet generator and/or and packet transmission by a packet-configuration component. For example, the parameters may include a number of backup packets, which may be duplicates of data packets to be transmitted to a given device, to be generated, a type of backup packet to be generated by the packet generator. The parameters may also include a packet-spacing value indicating when backup packets are to be sent and/or an order of sending the backup packets in association with the data packets. By way of example, the number of backup packets to be generated and/or sent may be 1, 2, 3, 4, or more backup packets. The type of backup packet may be a full duplicate of a given data packet, a compressed and/or simplified version of a full duplicate of a given data packet, and/or a parity packet. The packet-spacing value may indicate that a backup packet is to be sent immediately following transmission of the corresponding data packet, one packet after transmission of the data packet, two packets after transmission of the data packet, and/or more than two packets after transmission of the data packet. The order for sending backup packets may indicate when backup packets are to be sent in association with each other.

By way of example, in instances where the packet-loss data indicates that a given secondary device 104(*a*)-(*b*) frequently loses packets for short periods of time, the packet generator may generate one or two backup packets for each data packet, and the packet-configuration component may identify a low packet-spacing value such that when data packets are lost their corresponding backup packets are received from the primary device 102 quickly after sending of the data packets. In other examples where the packet-loss data indicates that a given secondary device 104(*a*)-(*b*) infrequently loses packets for longer periods of time, the packet generator may generate a small number of backup packets, and the packet-configuration component may identifier a higher packet-spacing value such that backup packets are sent after an anticipated packet-loss event concludes. By utilizing the processes and/or systems described herein, the amount of latency caused by the generation and sending of backup packets may be reduced while the resiliency to packet loss may be increased.

Additionally, or alternatively, the packet generator may generate parity packets, which may be utilized for adaptive information packet transmission. A parity packet may be generated utilizing two or more data packets and may represent, in a situation where there are two data packets used, either the first packet or the second packet. It should be noted that when the number of main packets covered by a parity packet is exactly one, this may be considered packet duplication. For example, the parity packet may be generated utilizing forward erasure coding. Forward erasure coding may utilize a forward error correction code that assumes bit erasures. The forward error correction code may transform a message with a certain number of symbols, and/or the data associated with those packets, into a longer message with more symbols such that the original message can be recovered from a subset of those symbols. In these examples, a parity packet may use forward erasure coding on messages from multiple data packets to generate a representation of the messages from both data packets. A parity check and/or polynomial oversampling may be utilized to recover one or more packets that are lost as long as the remaining packets are received along with the parity packet. For example, if a parity packet that represents a first data packet and a second data packet is sent, the first data packet or the second data packet may be recovered utilizing the parity packet when either the first data packet or the second data packet is lost and the parity packet is received. The parity packet may not be utilized to recover a lost packet if both the first data packet and the second data packet are lost. By utilizing parity packets instead of duplicate backup packets, the number of packets sent is decreased, which decreases bandwidth of packet transmission. The number of packets utilized to generate a parity packet may be static and/or may be dynamic and be based at least in part on historical packet-loss data indicating frequency of packet loss and/or a number of consecutive packets historically lost. In examples, configuration of the parity packets may be a factor considered for adaptive information packet transmission. For example, while parity packets may be configured such that no more than one main packet may be lost to reconstruct that main packet, the parity packets may also be configured such that two or more than two main packets may be lost and reconstruction may still be possible. In these examples, the complexity of the parity packet and the processing time and ability for generating such parity packets may be more than other parity-packet configurations. Generation of these more complex parity packets may utilize cyclical redundancy checking techniques. However, resiliency to multiple packets being lost may increase by utilizing the more complex parity-packet configuration. Such a configuration may be utilized, for example, when the feedback data and/or the historical packet-loss data indicates that multiple packets that are consecutively sent and/or that are sent near in time to each other are lost.

Additionally, or alternatively, the primary device 102 may identify, determine, and/or generate a delay value, such as 1 second, indicating a delay between when content data is received at the primary device 102 and when display of corresponding content occurs. This delay may be utilized to allow for data packet transmission to the secondary devices 104(a)-(b) as well as reordering of packets at the secondary devices 104(a)-(d), as needed.

At step 3, the secondary devices 104(a)-(b) may send feedback data to the primary device 102. For example, a feedback component of the secondary devices 104(a)-(b) may send feedback data to the primary device 102 indicating packet-loss information. The feedback data may be provided by the feedback component on the fly, and/or after packet transmission by the primary device 102. The feedback data may be utilized in one or more ways. For example, when the feedback data indicates that packet transmission is accomplished in less than the delay value, the delay value may be adjusted such that there is less delay between requesting display of content and display of that content.

Additionally, when the feedback data indicates a change in the frequency of packet loss and/or the number of lost packets, the packet-configuration component may adjust the number of backup packets generated and/or may adjust the packet-spacing value for sending backup packets. In other examples, a content buffer associated with the secondary devices 104(a)-(b) may be configured to buffer a certain amount of packets. When the feedback data indicates that the need for packet reordering is low and/or when packet loss decreases, a command may be sent from the primary device 102 to the secondary device 104(a)-(b) to decrease the amount of packets held in the content buffer. In other examples, the change to packet buffering may be initiated by the secondary device 104(a)-(b) and data indicating such a change may be sent to the primary device 102, such as utilizing the feedback component.

Additionally, or alternatively, the feedback data may be utilized to determine whether to refrain from sending data packets from the primary device 102. For example, the feedback data may indicate that at least a threshold number of packets have been lost and/or have been consecutively lost. In these examples, one or more data packets may be removed from the content buffer of the primary device 102 and/or one or more data packets may be skipped by the primary device 102 and not sent to the secondary devices 104(a)-(b). By so doing, the primary device 102 may refrain from sending data packets that, even if received by the secondary devices 104(a)-(b), would be considered lost because they would be received after an amount of time allowable by the content buffer of the secondary devices 104(a)-(b). By "skipping" packets, subsequent packets may be sent from the primary device 102 sooner to assist in mitigating the consequences of lost packets at the secondary devices 104(a)-(b).

Figure 3:
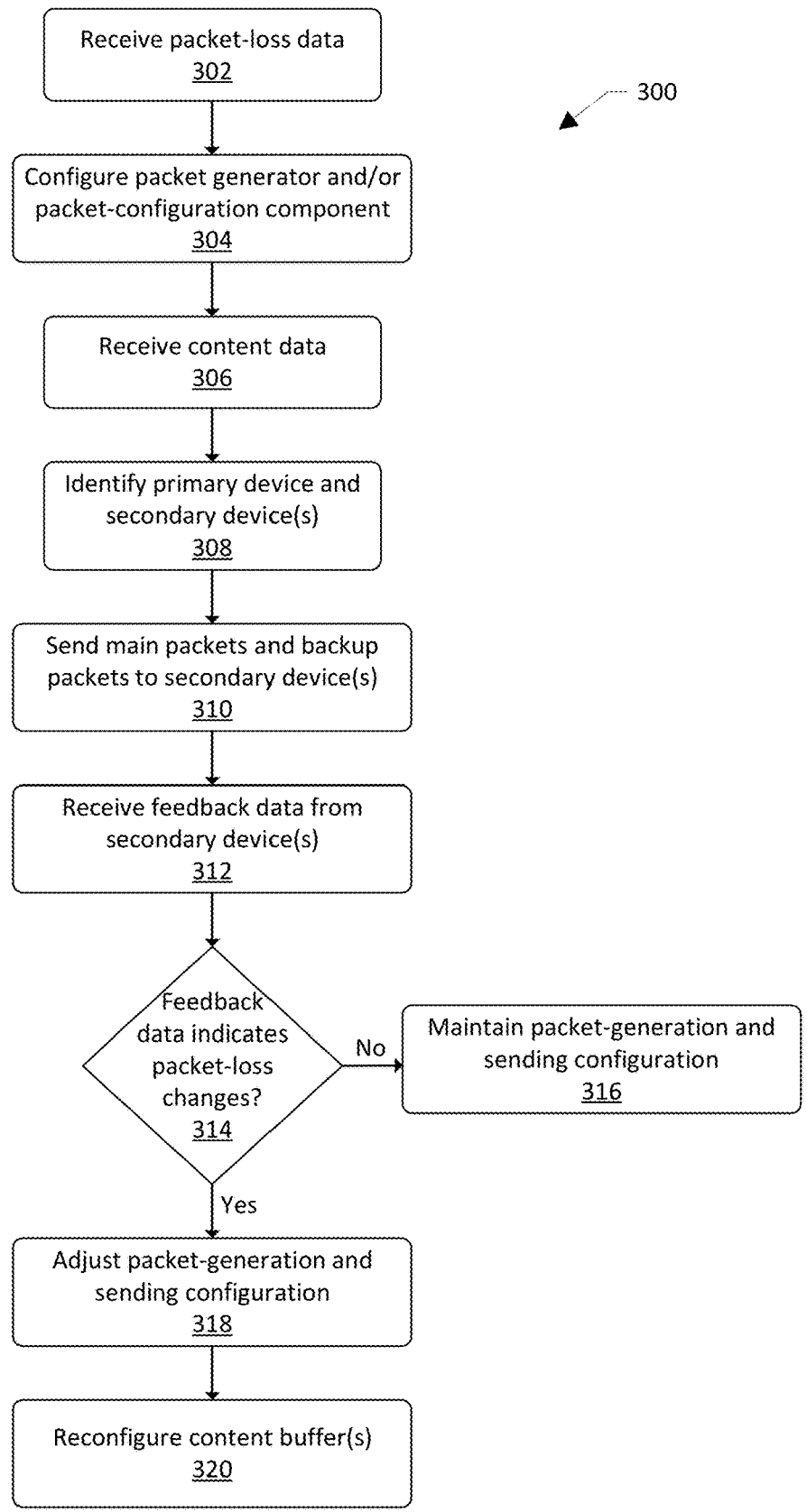
FIG. 3 illustrates a flow diagram of an example process for multiple device audio-videosynchronization.

FIG. 3 illustrates processes for multiple device audio-video synchronization. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1, 2, and 4-11, although the processes may be implemented in a wide variety of other environments, architectures and systems.

FIG. 3 illustrates a flow diagram of an example process 300 for multiple device audio-video synchronization. The order in which the operations or steps are described is not intended to be construed as a limitation, and any number of the described operations may be combined in any order and/or in parallel to implement process 300.

At block 302, the process 300 may include receiving packet-loss data. For example, a given device, described as a secondary device and/or group of secondary devices may be associated with certain packet-loss metrics that may indicate how frequently packets are lost when sent to that secondary device and/or a number of packets that are lost. By way of example, a given secondary device may be located in an area with other devices competing for bandwidth and/or with poor network connectivity. This example secondary device may historically have more frequent packet loss and/or may have more packets lost than another electronic device located in an area with fewer competing device and/or with better network connectivity. In still other examples, packet-loss data from one or more other devices having similar characteristics as a secondary device at issue may be utilized to determine packet-loss metrics for the device at issue. For example, packet-loss data from devices within a given geographic area of the device at issue, and/or from devices with the same or a similar device type of the device at issue, and/or from devices with the same or similar components as components of the device at issue may be utilized.

At block 304, the process 300 may include configuring a packet generator and/or a packet-configuration component of a primary device. For example, the packet-loss data may be utilized to determine one or more parameters for backup packet generation by the packet generator and/or and packet transmission by the packet-configuration component. For example, the parameters may include a number of backup packets, which may be duplicates of data packets to be transmitted to a given device, to be generated, a type of backup packet to be generated by the packet generator. The parameters may also include a packet-spacing value indicating when backup packets are to be sent and/or an order of sending the backup packets in association with the data packets. By way of example, the number of backup packets to be generated and/or sent may be 1, 2, 3, 4, or more backup packets. The type of backup packet may be a full duplicate of a given data packet, a compressed and/or simplified version of a full duplicate of a given data packet, and/or a parity packet. The packet-spacing value may indicate that a backup packet is to be sent immediately following transmission of the corresponding data packet, one packet after transmission of the data packet, two packets after transmission of the data packet, and/or more than two packets after transmission of the data packet. The order for sending backup packets may indicate when backup packets are to be sent in association with each other.

By way of example, in instances where the packet-loss data indicates that a given secondary device frequently loses packets for short periods of time, the packet generator may generate one or two backup packets for each data packet, and the packet-configuration component may identify a low packet-spacing value such that when data packets are lost their corresponding backup packets are received from the primary device quickly after sending of the data packets. In other examples where the packet-loss data indicates that a given secondary device infrequently loses packets for longer periods of time, the packet generator may generate a small number of backup packets, and the packet-configuration component may identifier a higher packet-spacing value such that backup packets are sent after an anticipated packet-loss event concludes. By utilizing the processes and/or systems described herein, the amount of latency caused by the generation and sending of backup packets may be reduced while the resiliency to packet loss may be increased.

Additionally, or alternatively, the packet generator may generate parity packets, which may be utilized for adaptive information packet transmission. A parity packet may be generated utilizing two or more data packets and may represent, in a situation where there are two data packets used, either the first packet or the second packet. For example, the parity packet may be generated utilizing forward erasure coding. Forward erasure coding may utilize a forward error correction code that assumes bit erasures. The forward error correction code may transform a message with a certain number of symbols, and/or the data associated with those packets, into a longer message with more symbols such that the original message can be recovered from a subset of those symbols. In these examples, a parity packet may use forward erasure coding on messages from multiple data packets to generate a representation of the messages from both data packets. A parity check and/or polynomial oversampling may be utilized to recover one or more packets that are lost as long as the remaining packets are received along with the parity packet. For example, if a parity packet that represents a first data packet and a second data packet is sent, the first data packet or the second data packet may be recovered utilizing the parity packet when either the first data packet or the second data packet is lost and the parity packet is received. The parity packet may not be utilized to recover a lost packet if both the first data packet and the second data packet are lost. By utilizing parity packets instead of duplicate backup packets, the number of packets sent is decreased, which decreases bandwidth of packet transmission. The number of packets utilized to generate a parity packet may be static and/or may be dynamic and be based at least in part on historical packet-loss data indicating frequency of packet loss and/or a number of consecutive packets historically lost.

Additionally, or alternatively, configuring the packet generator and/or the packet-configuration component of a primary device may be based at least in part on contextual data associated with the primary device, one or more of the second devices, and/or an environment associated with one or more of the devices. For example, the contextual data may include information indicating when data packets are late and/or lost, such as a time of day and/or a day of the week and/or a day of the month that packets are late and/or lost. By way of example, the contextual data may indicate that data packets sent to a given secondary device between the hours of 7:00 pm and 9:00 pm, such as on weekdays, are lost more frequently and/or at a different rate and/or in a different manner than packets sent at other times of the data. In these examples, the packet generator and/or the packet-configuration component may adjust the number of duplicate and/or parity packets that are to be generated and/or the packet-configuration component may adjust the packet-spacing value and/or the order of packet sending to account for the packet loss indicated by the contextual data. In examples, the contextual data may be acquired by the primary device and/or a remote system prior to packet sending. For example, a bandwidth use associated with the environment in which the devices are situated may be requested, determined, and/or received. The bandwidth use may be a component of the contextual data and may be utilized to inform the generation and sending of packets as described herein.

At block 306, the process 300 may include receiving content data. By way of example, a user may request that content may be displayed and/or otherwise output utilizing devices located in an environment. The request may be from user input to, for example, a personal device such as a mobile phone, tablet, and/or computer, and/or the request may be from a user utterance spoken by the user and captured by a microphone of one or more of the devices within the environment. For example, a user may provide input indicating an intent to play a video associated with a movie on a television within the environment while one or more other devices, such as audio-output devices, output audio corresponding to the movie. Input data corresponding to the input may be sent to, for example, the remote system configured to retrieve content associated with the request. In examples where the input comprises a user utterance, audio data corresponding to the user utterance may be sent to the remote system. The speech-processing system may generate intent data indicating an intent associated with the user utterance. In the example where the user utterance indicates an intent to output content on the one or more devices, an A/V speechlet may receive the intent data and/or a payload associated with the intent data and may utilize that information to determine what content is to be provided to the primary device for output. An A/V retrieval component may retrieve the requested content and the remote system may send the content to the primary device. The content, in a given example may include image data and audio data. In other examples, the content may include just image data, just audio data, and/or other types of data, such as text data.

At block 308, the process 300 may include identifying a primary device and one or more secondary devices. For example, the primary device may be selected based at least in part on one or more factors associated with the primary device and one or more secondary devices associated with the environment. These factors will be described in more detail with respect to FIGS. 10 and 11. For example, a hub-selection component may receive a message, from one or more of the secondary device and/or the remote system, indicating that it is to act as the primary device based on that device having a display and/or as the device that received the input from the user and/or based on the device having more computing resources than other devices in the environment. The primary device may send one or more messages to the secondary devices, and those messages may be received by the hub-selection component of the secondary devices. Receipt of the messages may result in the secondary devices enabling a content buffer and/or a feedback component and/or enabling receipt of data packets from the primary device.

At block 310, the process 300 may include sending main data packets and backup packets to the secondary devices. For example, while or after the packet generator generates the backup packets and/or while or after the packet-configuration component determines the packet-spacing value and/or order of packet sending as described above, the primary device may initiate sending of the main data packets and the backup packets to the secondary devices.

At block 312, the process 300 may include receiving feedback data from the secondary devices. For example, a feedback component of the secondary devices may send feedback data to the primary device indicating packet-loss information. The feedback data may be provided by the feedback component on the fly, and/or after packet transmission by the primary device.

At block 314, the process 300 may include determining whether the feedback data indicates packet-loss changes with respect to the packet-loss data. For example, the feedback data may indicate that more or less packets were lost during transmission than anticipated from the packet-loss data. The feedback data may also indicate that packet loss occurs more or less frequently and/or for a shorter or longer duration than anticipated from the packet-loss data.

If the feedback data does not indicate a change in packet-loss by the secondary device(s), then at block 316, the process 300 may include maintaining packet-generation configuration of the packet generator and maintaining packet-sending configuration of the packet-configuration component. In these examples, the primary device may continue to send data packets and backup packets utilizing the same number of backup packets, packet-spacing value, and packet-sending order.

If the feedback data indicates a change in packet-loss by the secondary device(s), then at block 318, the process 300 may include adjusting packet-generation of the packet generator and/or adjusting the packet-sending configuration of the packet-configuration component. For example, when the feedback data indicates a change in the frequency of packet loss and/or the number of lost packets, the packet-configuration component may adjust the number of backup packets generated and/or may adjust the packet-spacing value for sending backup packets.

At block 320, the process 300 may include reconfiguring one or more content buffers based at least in part on the feedback data. For example, the content buffer associated with the secondary devices may be configured to buffer a certain amount of packets. When the feedback data indicates that the need for packet reordering is low and/or when packet loss decreases, a command may be sent from the primary device to the secondary device to decrease the amount of packets held in the content buffer. In other examples, the change to packet buffering may be initiated by the secondary device and data indicating such a change may be sent to the primary device, such as utilizing the feedback component.

Reconfiguring one or more of the content buffers may include a number of processes to diminish impact to the viewing and/or listening quality of the data at issue. For example, if a given buffered amount of packets was reduced too quickly, a portion of the images and/or audio may not be output and/or may be output too quickly and/or too slowly with respect to other packets. This may result in a portion of the video and/or audio being output to speed up and/or slow down for a short period of time, which may cause a noticeable difference to a user. To account for this, the content buffer may be reconfigured to buffer a smaller or larger number of packets over time and/or in response to one or more events occurring to diminish and/or remove adverse viewing and/or listening disturbances. For example, the buffer may reduce the number of buffered packets gradually, such as by a certain number of packets per second. In other examples, one or more events may occur and the number of buffered packets may be reduced based at least in part on an indication of the one or more events occurring. For example, when a user interacts with a device, such as pressing pause, stop, rewind, skip, fast forward, etc., the content buffer may be reconfigured. Other events may include an indication of a commercial break, a scene break, a song ending, and/or an indication that a portion of the image data corresponding to a black screen, for example. It should be noted that while given examples of events are described herein, other events used to adjust a content buffer such that viewing and/or listening quality is maintained and/or negative impact on such quality is reduced are included in this disclosure.

Additionally, or alternatively, the feedback data may be utilized to determine whether to refrain from sending data packets from the primary device. For example, the feedback data may indicate that at least a threshold number of packets have been lost and/or have been consecutively lost. In these examples, one or more data packets may be removed from the content buffer and/or one or more data packets may be skipped by the primary device and not sent to the secondary devices. By so doing, the primary device may refrain from sending data packets that, even if received by the secondary devices, would be considered lost because they would be received after an amount of time allowable by the content buffer of the secondary devices. By "skipping" packets, subsequent packets may be sent from the primary device sooner to assist in mitigating the consequences of lost packets at the secondary devices.

FIGS. 4A-D illustrate conceptual diagrams of example packet-sending configurations for multiple device audio-video synchronization. The various configurations shown in FIGS. 4A-D are illustrative only and should not be considered the exclusive configurations for sending data packets from a primary device to one or more secondary devices. Various notations are utilized in FIGS. 4A-D to simplify those figures. For example, "M1" refers to a data packet to be sent to one or more secondary devices with the "1" differentiating the notation of the data packet from other data packets, which may include the notations "M2," "M3," "M4," and so on. Additionally, "B1" refers to a backup packet corresponding to a data packet with the same numerical notation. For example, B1 is the backup packet that corresponds to the M1 data packet, B2 is the backup packet that corresponds to the M2 data packet, and so on. The use of notations such as "M1a" and "M1b" also denote various data packets, but with respect to differing data configurations. For example, when the data packets are associated with audio data, various audio compression technologies may be utilized, such as Dolby Digital. In these examples, M1a may be considered a first portion of an audio frame while M1b may be considered a second portion of the audio frame. Frames may be divided into multiple packets in situations where the size of the frame exceeds a maximum transmission unit for packets. Additionally, when an "X" is noted in the packet configuration, the "X" indicates that no packets are sent during that period of time. Lastly, the packet configurations as shown in FIGS. 4A-D are meant to be read from left to right, with the packet indicated on the left-hand side being sent prior to the packet to its right. To illustrate an example timing of packet sending, every four packets may be associated with a sending time of approximately 31.25 milliseconds. Additional and/or different sending times may be utilized depending on the configurations of the primary and secondary devices. Some or all of the configurations described with respect to FIGS. 4A-D may be identified, determined, generated, and/or utilized based at least in part on the packet-loss data and/or the feedback data described elsewhere herein. It should also be noted that different compression and/or encoding techniques may be utilized when generating and/or sending packets.

FIG. 4A illustrates Configuration 1 and Configuration 2 of adaptive information packet transmission. With respect to Configuration 1, the number of backup packets may be set to 1 and the packet-spacing value may be set to 1 such that the backup packets are sent immediately following the main data packets being sent. For example, the M1a and M1b data packets may be sent, and the B0a and B0b backup packets may be sent. This sequence may be repeated for other data packets to be sent to the secondary devices. For example, the M2a and M2b data packets may be sent, followed by the B1a and B1b backup packets, then the M3a and M3b data packets may be sent, then the B2a and B2b may be sent. With respect to Configuration 2, the number of backup packets may be set to 1 and the packet-spacing value may be set to 3 such that the backup packets are sent after 2 other packets, or packet sets in this case. For example, the M1a and M1b data packets may be sent, then the B-1a and B-1b backup packets may be sent. Here, B-1a and B-1b represent the backup packets for a previous main data packet. Thereafter, the M2a and M2b data packets may be sent, then the B0a and B0b backup packets may be sent. Then the M3a and M3b data packets may be sent, etc. It should be understood that a given MTU may include one frame or more than one frame or a fraction of one frame. It should be further understood that two or more of the packets may be associated with a single audio frame, including a given backup frame, and a single frame may not necessarily be sent as a single MTU. Configurations 1 and 2 illustrate configurations where a given frame of content is split into two or more packets. In these examples, the packet-loss data and/or feedback data may be utilized to determine how to split a given frame and/or frames into packets. For example, if a frame size is approximately 1,800 bytes and the maximum transmission unit for a packet is 1,500, the frame may be split such that a given packet has 1,500 bytes, with the remainder of the frame making up the second packet. The processes described herein may be utilized to determine, for example, that the first packet should have the same number of bytes as the second packet, that the first packet should have more bytes than the second packet, and/or that the first packet should have fewer bytes than the second packet. The packet-loss data and/or the feedback data may be utilized to identify when packet loss is most likely to occur and minimize the size of the packets that are anticipated to be dropped, while maximizing the size of the packets that are not anticipated to be dropped.

FIG. 4B illustrates Configurations 3-7 of adaptive information packet transmission. With respect to Configuration 3, the number of backup packets may be set to 3 and the packet-spacing value may be set to 1. In this example, the M1 data packet may be sent, and the first B0, B-1, and B-2 backup packets may be sent, and so on. With respect to Configuration 4, the number of backup packets may also be set to 3 but the packet-spacing value may be set to 3 instead of 1. In this example, while the same number of backup packets are sent, when those packets are sent and the order of backup packet sending differs from Configuration 3. For example, the M1 data packet may be sent, and the backup packets B-2, B-1, and B0 from previous data packets may be sent. Configurations 3 and 4 illustrate an ordering difference where backup packets are sent in an ascending order versus a descending order.

With respect to Configuration 5, the number of backup packets may be set to 0, but the packet-spacing value may be some value greater than 1, here illustrated as 4. In this example, only main data packets may be sent, but the packets are sent in a spaced-out manner. Configuration 5 illustrates a configuration with no resiliency given that no backup packets are sent, but also with a lower bandwidth usage than the previously-described configurations. With respect to Configuration 6, the number of backup packets may be set to 1 and the packet-spacing value may be set to 2 with a delay between packet sending. For example, the M1 data packet may be sent, then a delay, then the B0 backup packet, then a delay, then the M2 data packet, then a delay, then the B1 backup packet, then a delay, then the M3 data packet, then a delay, and then the B2 backup packet. Configuration 7 illustrates the number of backup packets being set to 1 and the packet-spacing value being set to 6 with delays introduced. For example, the M1 data packet may be sent, then a delay, then the B-1 backup packet from a previous data packet, then a delay, then the M2 data packet, then a delay, then the B0 backup packet, then a delay, then the M3 data packet, then a delay, and then the B1 backup packet.

FIG. 4C illustrates Configurations 8-11 of adaptive information packet transmission. With respect to Configuration 8, the number of backup packets may be set to 1 and the packet-spacing value may be set to 1. For example, the M1 data packet may be sent and then the B0 backup packet may be sent. This process may be repeated for subsequent data packets and backup packets. With respect to Configuration 9, the number of backup packets may be set to 1 and the packet-spacing value may be set to 3. For example, the M1 data packet may be sent, and the B-1 backup packet for a previous data packet may be sent. Then the M2 data packet may be sent and the B0 backup packet may be sent. This process may be repeated for subsequent data packets and backup packets. With respect to Configuration 10, the number of backup packets may be set to 1 and the packet-spacing value may be set to 5. For example, the M1 data packet may be sent, and the B-2 backup packet for a previous data packet may be sent, then the M2 data packet may be sent and the B-1 backup packet may be sent, then the M3 data packet may be sent and the B0 backup packet may be sent. This process may be repeated for subsequent data packets and backup packets. With respect to Configuration 11, the number of backup packets may be set to 0, but delays may be introduced into the packet-sending process. For example, a 1-packet delay may be set instead of a 3-packet delay as described with respect to Configuration 5.

FIG. 4D illustrates Configurations 12 and 13 of adaptive information packet transmission. The boxes representing packets in Configurations 12 and 13 are illustrated as being of different sizes. The illustration of box size is meant to provide a visual indication of packet size with respect to a number of bytes of a given packet and/or an amount of compression of a given packet. Using Configuration 12 as an example, main packet M1 is illustrated as a larger packet than backup packet B1. In this example, backup packet B1 may be a more compressed version of main packet M1 and/or backup packet B1 may include fewer bytes than main packet M1. With respect to Configuration 12, a given degree of packet compression may be applied for backup packets. By so doing, the bandwidth utilized to send backup packets is reduced from a backup packet having no compression. As can be seen in a comparison of Configuration 12 with Configuration 8 from FIG. 4C, by compressing backup packets, two additional main packets, M7 and M8, and one additional backup packet, B7, may be sent using approximately the same bandwidth as the packet-sending configuration in Configuration 8. With respect to Configuration 13, a different degree of packet compression may be applied for backup packets. In this example, backup packets are more compressed in Configuration 13 than in Configuration 12. As can be seen in FIG. 4D, this additional compression may allow for one or more additional main packets and/or backup packets to be sent using approximately the same bandwidth as the packet-sending configuration in Configuration 12. A degree of compression may be based at least in part on the packet-loss data, the feedback data, and/or a configuration of a device receiving the packets. For example, when a main packet is lost but its backup packet is received and utilized in its place, the compressed nature of the backup packet may result in output of content corresponding to that packet that is slightly different than output of content corresponding to the respective main packet. The more compressed a packet is, the more likely the output of corresponding content will differ from the content corresponding to the main packet. As such, if main packets are frequently dropped and backup packets are frequently utilized in place of such dropped packets, a lower degree of compression may be utilized such that the difference in content output is minimized. In other examples where packet loss is less frequently and/or when the capabilities of the receiving device assist in reducing the perceptible differences in content output between main packets and compressed backup packets, a higher degree of compression may be utilized.

FIG. 5 illustrates a conceptual diagram of additional example packet-sending configurations for adaptive information packet transmission. The various configurations shown in FIG. are illustrative only and should not be considered the exclusive configurations for sending data packets from a primary device to one or more secondary devices. Various notations are utilized in FIG. 5 to simplify those figures. For example, "M1" refers to a data packet to be sent to one or more secondary devices with the "1" differentiating the notation of the data packet from other data packets, which may include the notations "M2," "M3," "M4," and so on. Additionally, "P12" refers to a parity packet corresponding to the M1 and M2 data packets. The packet configurations as shown in FIG. 5 are meant to be read from left to right, with the packet indicated on the left-hand side being sent prior to the packet to its right. To illustrate an example timing of packet sending, every four packets may be associated with a sending time of approximately 31.25 milliseconds. Additional and/or different sending times may be utilized depending on the configurations of the primary and secondary devices. Some or all of the configurations described with respect to FIG. 4 may be identified, determined, generated, and/or utilized based at least in part on the packet-loss data and/or the feedback data described elsewhere herein.

The parity packets described with respect to FIG. 5 may be generated and utilized for adaptive information packet transmission. A parity packet may be generated utilizing two or more data packets and may represent, in a situation where there are two data packets used, either the first packet or the second packet. For example, the parity packet may be generated utilizing forward erasure coding. Forward erasure coding may utilize a forward error correction code that assumes bit erasures. The forward error correction code may transform a message with a certain number of symbols, and/or the data associated with those packets, into a longer message with more symbols such that the original message can be recovered from a subset of those symbols. In these examples, a parity packet may use forward erasure coding on messages from multiple data packets to generate a representation of the messages from both data packets. A parity check and/or polynomial oversampling may be utilized to recover one or more packets that are lost as long as the remaining packets are received along with the parity packet. For example, if a parity packet that represents a first data packet and a second data packet is sent, the first data packet or the second data packet may be recovered utilizing the parity packet when either the first data packet or the second data packet is lost and the parity packet is received. The parity packet may not be utilized to recover a lost packet if both the first data packet and the second data packet are lost. By utilizing parity packets instead of duplicate backup packets, the number of packets sent is decreased, which decreases bandwidth of packet transmission. The number of packets utilized to generate a parity packet may be static and/or may be dynamic and be based at least in part on historical packet-loss data indicating frequency of packet loss and/or a number of consecutive packets historically lost.

With respect to Parity Configuration 1, a parity packet may be generated for every two main data packets. For example, the P12 parity packet may be generated for the M1 and M2 data packets, the P34 parity packet may be generated for the M3 and M4 data packets, and so forth. In these examples, the parity packet may be sent following sending of the main data packets that it corresponds to. For example, the M1 data packet and the M2 data packet may be sent, and then the P12 parity packet may be sent. In other examples, a packet-spacing value may be introduced and/or a delay may be introduced such that the parity packet is not sent immediately following sending of its corresponding main data packets. With respect to Parity Configuration 2, a parity packet may be generated for every four main data packets. For example, the P1-4 parity packet may be generated for the M1, M2, M3, and M4 data packets. In this example, the number of parity packets is reduced by 50%, which decreases the total bandwidth of packet sending between the primary device and the secondary devices. With respect to Parity Configuration 3, a parity packet may be generated for every eight main data packets. For example, the P1-8 parity packet may be generated for the M1, M2, M3, M4, M5, M6, M7, and M8 main data packets. In this example, the number of parity packets is reduced from the number of parity packets sent with respect to Parity Configuration 1 and Parity Configuration 2.

Figure 6:
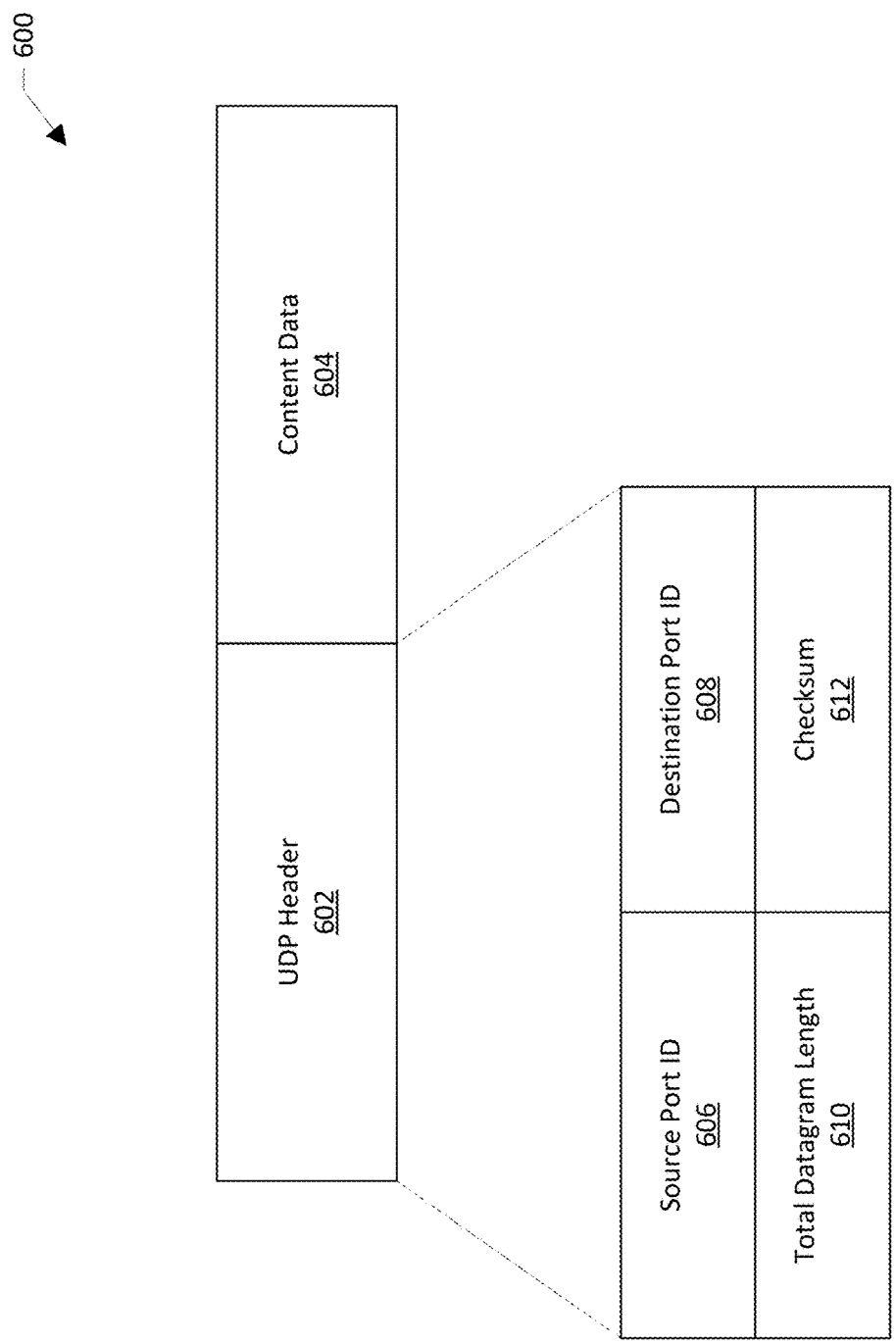
FIG. 6 illustrates a conceptual diagram of an example information packet sent during multiple device audio-video synchronization.

FIG. 6 illustrates a conceptual diagram of an example information packet 600 sent during multiple device audio-video synchronization. This packet 600 may be sent utilizing the UDP protocol as outlined more fully above. The packet 600 may include a UDP header 602 and the content data 604, otherwise described as the message associated with the packet 600. In examples, the content data 604 may include a portion of the content to be sent from a primary device to a secondary device. Utilizing the example provided above, the content data may include audio data to be sent to an audio-output device.

The UDP header 602 may include one or more components, such as a source port identifier 606, a destination port identifier 608, a total datagram length 610, and a checksum 612. The source port identifier 606 may include a port number used by a source host that is transferring the data at issue. For example, the source port identifier 606 may include the port number or other identifier for the primary device sending the content data. The destination port identifier 608 may include the port number or other identifier used by the destination host that is receiving the data at issue. For example, the destination port identifier 608 may include the port number or other identifier for the secondary device that is receiving the content data. The total datagram length 610 may include the total length of the datagram at issue while the checksum 612 may include an indication of error detection associated with the data. The UDP header 602 may also include a time stamp associated with the sending of the packet and/or a sequence number for the packet. The sequence number may be utilized by the secondary device to determine where a given packet should be ordered with respect to other packets. As described more fully above, the use of UDP may result in packets arriving at the secondary device out of order, but the sequence number of a given packet may be utilized to reorder the packets at the secondary device, such as utilizing a content buffer.

Figure 7:
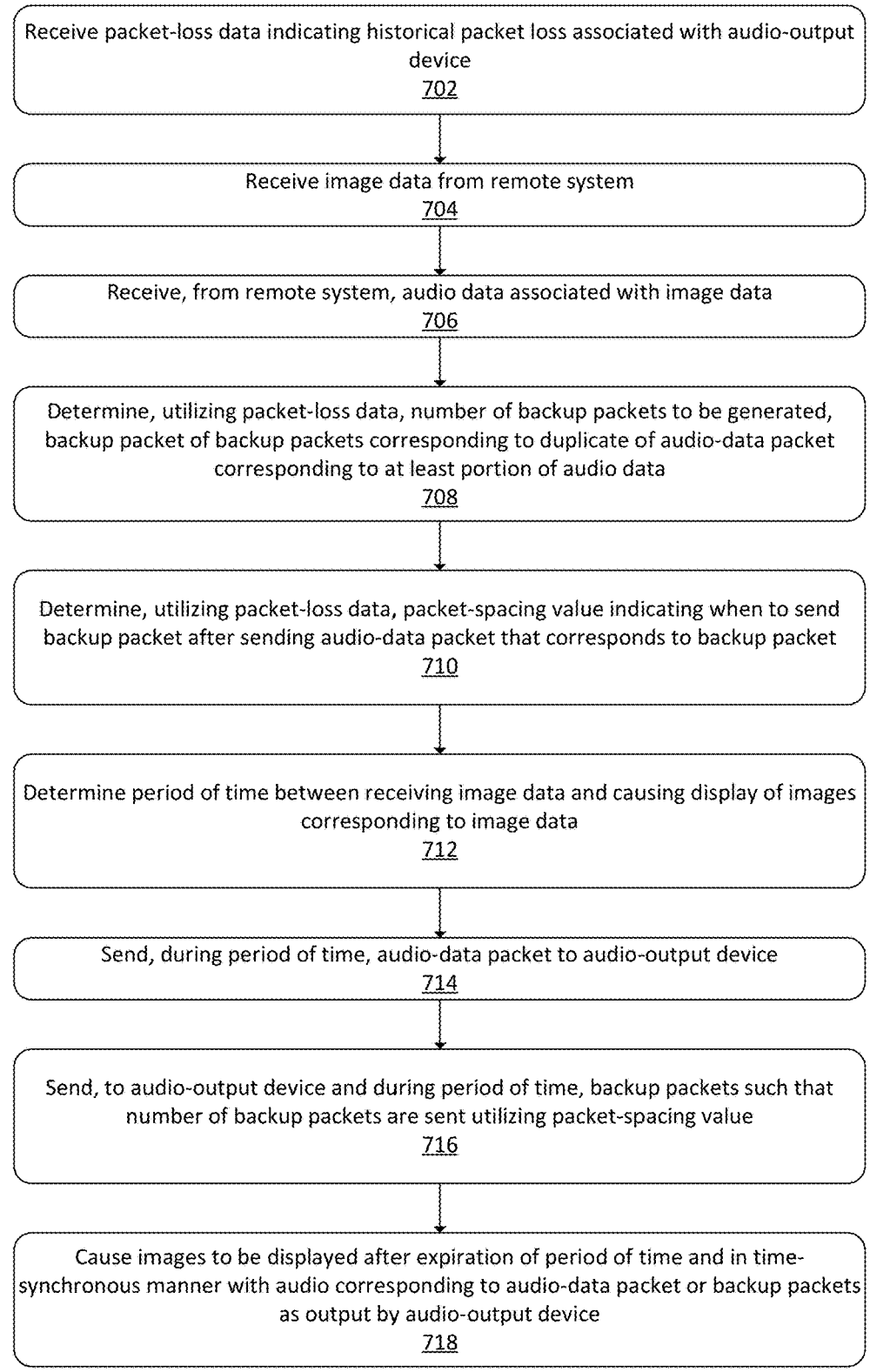
FIG. 7 illustrates a flow diagram of an example process for multiple device audio-video synchronization.
Figure 8:
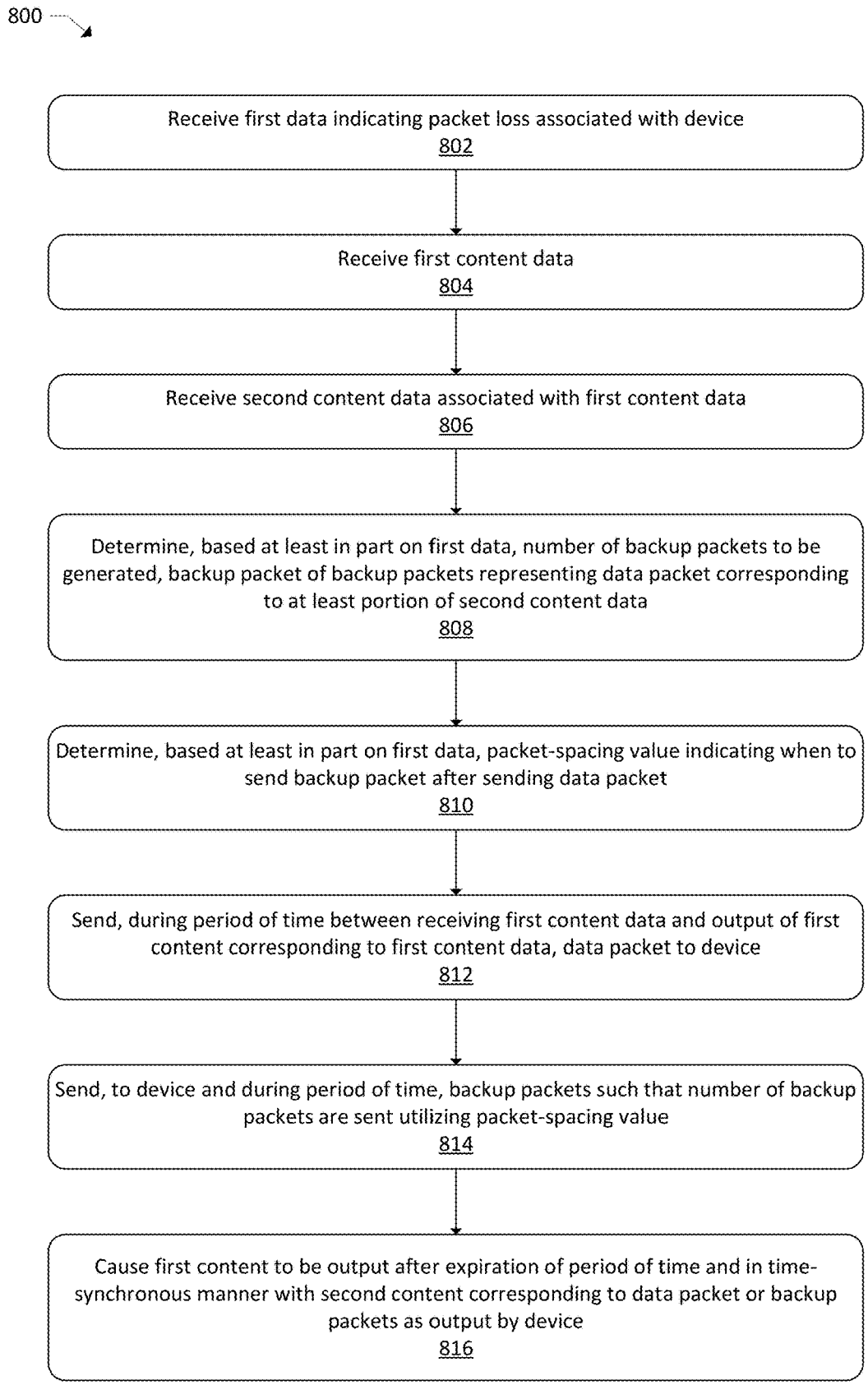
FIG. 8 illustrates a flow diagram of another example process for multiple device audio-video synchronization.

FIGS. 7 and 8 illustrates processes for multiple device audio-video synchronization. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-6 and 9-11, although the processes may be implemented in a wide variety of other environments, architectures and systems.

FIG. 7 illustrates a flow diagram of an example process 700 for multiple device audio-video synchronization. The order in which the operations or steps are described is not intended to be construed as a limitation, and any number of the described operations may be combined in any order and/or in parallel to implement process 700.

At block 702, the process 700 may include receiving packet-loss data indicating historical packet loss associated with an audio-output device. For example, a given device, described as a secondary device and/or group of secondary devices may be associated with certain packet-loss metrics that may indicate how frequently packets are lost when sent to that secondary device and/or a number of packets that are lost. By way of example, a given secondary device may be located in an area with other devices competing for bandwidth and/or with poor network connectivity. This example secondary device may historically have more frequent packet loss and/or may have more packets lost than another electronic device located in an area with fewer competing device and/or with better network connectivity. In still other examples, packet-loss data from one or more other devices having similar characteristics as a secondary device at issue may be utilized to determine packet-loss metrics for the device at issue. For example, packet-loss data from devices within a given geographic area of the device at issue, and/or from devices with the same or a similar device type of the device at issue, and/or from devices with the same or similar components as components of the device at issue may be utilized.

At block 704, the process 700 may include receiving image data from a remote system. By way of example, a user may request that content may be displayed and/or otherwise output utilizing devices located in an environment. The request may be from user input to, for example, a personal device such as a mobile phone, tablet, and/or computer, and/or the request may be from a user utterance spoken by the user and captured by a microphone of one or more of the devices within the environment. For example, a user may provide input indicating an intent to play a video associated with a movie on a television within the environment while one or more other devices, such as audio-output devices, output audio corresponding to the movie. Input data corresponding to the input may be sent to, for example, the remote system configured to retrieve content associated with the request. In examples where the input comprises a user utterance, audio data corresponding to the user utterance may be sent to the remote system. The speech-processing system may generate intent data indicating an intent associated with the user utterance. In the example where the user utterance indicates an intent to output content on the one or more devices, an A/V speechlet may receive the intent data and/or a payload associated with the intent data and may utilize that information to determine what content is to be provided to the primary device for output. An A/V retrieval component may retrieve the requested content and the remote system may send the content to the primary device. The content, in a given example may include image data and audio data. In other examples, the content may include just image data, just audio data, and/or other types of data, such as text data.

At block 706, the process 700 may include receiving, from the remote system, audio data associated with the image data. For example, the audio data may be received from the remote system in the form of audio-data packets and/or the audio data may be received from the remote system, and a primary device may format the audio data into audio-data packets.

At block 708, the process 700 may include determining, utilizing the packet-loss data, a number of backup packets to be generated, a backup packet of the backup packets corresponding to a duplicate of an audio-data packet corresponding to at least a portion of the audio data. For example, the packet-loss data may be utilized to determine one or more parameters for backup packet generation by the packet generator and/or and packet transmission by the packet-configuration component. For example, the parameters may include a number of backup packets, which may be duplicates of data packets to be transmitted to a given device, to be generated, a type of backup packet to be generated by the packet generator. The type of backup packet may be a full duplicate of a given data packet, a compressed and/or simplified version of a full duplicate of a given data packet, and/or a parity packet.

Additionally, or alternatively, the packet generator may generate parity packets, which may be utilized for adaptive information packet transmission. A parity packet may be generated utilizing two or more data packets and may represent, in a situation where there are two data packets used, either the first packet or the second packet. For example, the parity packet may be generated utilizing forward erasure coding. Forward erasure coding may utilize a forward error correction code that assumes bit erasures. The forward error correction code may transform a message with a certain number of symbols, and/or the data associated with those packets, into a longer message with more symbols such that the original message can be recovered from a subset of those symbols. In these examples, a parity packet may use forward erasure coding on messages from multiple data packets to generate a representation of the messages from both data packets. A parity check and/or polynomial oversampling may be utilized to recover one or more packets that are lost as long as the remaining packets are received along with the parity packet. For example, if a parity packet that represents a first data packet and a second data packet is sent, the first data packet or the second data packet may be recovered utilizing the parity packet when either the first data packet or the second data packet is lost and the parity packet is received. The parity packet may not be utilized to recover a lost packet if both the first data packet and the second data packet are lost. By utilizing parity packets instead of duplicate backup packets, the number of packets sent is decreased, which decreases bandwidth of packet transmission. The number of packets utilized to generate a parity packet may be static and/or may be dynamic and be based at least in part on historical packet-loss data indicating frequency of packet loss and/or a number of consecutive packets historically lost.

At block 710, the process 700 may include determining, utilizing the packet-loss data, a packet-spacing value indicating when to send the backup packet after sending the audio-data packet that corresponds to the backup packet. For example, the parameters described with respect to block 708 may also include a packet-spacing value indicating when backup packets are to be sent and/or an order of sending the backup packets in association with the data packets. By way of example, the number of backup packets to be generated and/or sent may be 1, 2, 3, 4, or more backup packets. The packet-spacing value may indicate that a backup packet is to be sent immediately following transmission of the corresponding data packet, one packet after transmission of the data packet, two packets after transmission of the data packet, and/or more than two packets after transmission of the data packet. The order for sending backup packets may indicate when backup packets are to be sent in association with each other.

At block 712, the process 700 may include determining a period of time between receiving the image data and causing display of images corresponding to the image data. The delay value may be static and/or the delay value may be based at least in part on the type of data being sent, the devices and their components, and/or the packet-loss data.

At block 714, the process 700 may include sending, during the period of time, the audio-data packet to the audio-output device. For example, the audio-data packets may be sent based at least in part on the scheduled sending of audio-data packets and backup packets as described herein.

At block 716, the process 700 may include sending, to the audio-output device and during the period of time, the backup packets such that the number of the backup packets are sent utilizing the packet-spacing value.

At block 718, the process 700 may include causing the images to be displayed after expiration of the period of time and in a time-synchronous manner with audio corresponding to the audio-data packet or the backup packets as output by the audio-output device. For example, once the period of time has lapsed, the display of the primary device may present the images while the audio-output device(s) output the corresponding audio.

Additionally, or alternatively, the process 700 may include receiving, from the audio-output device, first data indicating a number of audio-data packets that are not received by the audio-output device during the period of time. The process 700 may also include receiving, from the audio-output device, second data indicating a number of consecutive lost packets. The process 700 may also include determining to increase the number of backup packets and/or the packet-spacing value from the number of the audio-data packets that are not received by the audio-output device during the period of time and the number of consecutive lost packets.

Additionally, or alternatively, the process 700 may include determining, from the packet-loss data, that at least one packet of two consecutive packets is received by the audio-output device. The process 700 may also include generating, in response to determining that the at least one packet of the two consecutive packets is received by the audio-output device, a parity packet corresponding to a second audio-data packet and a third audio-data packet. The process 700 may also include sending the parity packet to the audio-output device instead of at least a portion of the backup packets.

Additionally, or alternatively, the process 700 may include receiving, from the audio-output device, feedback data indicating that a number of lost packets satisfies a threshold number of lost packets. The process 700 may also include removing, in response to the feedback data indicating the number of lost packets satisfies the threshold number of lost packets, a first portion of the audio-data packets and corresponding backup packets from a packet queue. The process 700 may also include sending, to the audio-output device, a second portion of the audio-data packets and the corresponding backup packets instead of the first portion.

Additionally, or alternatively, the process 700 may include receiving, from the audio-output device, feedback data indicating that a number of lost packets satisfies a threshold number of lost packets. The process 700 may also include sending, to the audio-output device and in response to the feedback data, a command to decrease an amount of buffered audio data associated with the audio-output device, the command indicating an event that, upon occurrence of the event, causes the amount of the buffered audio data to decrease, the event including at least one of an indication that a user has provided input, detection of an audio-gap in the audio data, or detection of image data indicating a black screen.

FIG. 8 illustrates a flow diagram of another example process 800 for multiple device audio-video synchronization. The order in which the operations or steps are described is not intended to be construed as a limitation, and any number of the described operations may be combined in any order and/or in parallel to implement process 800.

At block 802, the process 800 may include first data indicating packet loss associated with a device. For example, a given device, described as a secondary device and/or group of secondary devices may be associated with certain packet-loss metrics that may indicate how frequently packets are lost when sent to that secondary device and/or a number of packets that are lost. By way of example, a given secondary device may be located in an area with other devices competing for bandwidth and/or with poor network connectivity. This example secondary device may historically have more frequent packet loss and/or may have more packets lost than another electronic device located in an area with fewer competing device and/or with better network connectivity. In still other examples, packet-loss data from one or more other devices having similar characteristics as a secondary device at issue may be utilized to determine packet-loss metrics for the device at issue. For example, packet-loss data from devices within a given geographic area of the device at issue, and/or from devices with the same or a similar device type of the device at issue, and/or from devices with the same or similar components as components of the device at issue may be utilized. The process 800 may include receiving data packets and/or data. For example, the data may be received from the remote system in the form of data packets and/or the data may be received from the remote system, and a primary device may format the data into data packets.

At block 804, the process 800 may include receiving first content data. By way of example, a user may request that content may be displayed and/or otherwise output utilizing devices located in an environment. The request may be from user input to, for example, a personal device such as a mobile phone, tablet, and/or computer, and/or the request may be from a user utterance spoken by the user and captured by a microphone of one or more of the devices within the environment. For example, a user may provide input indicating an intent to play a video associated with a movie on a television within the environment while one or more other devices, such as audio-output devices, output audio corresponding to the movie. Input data corresponding to the input may be sent to, for example, the remote system configured to retrieve content associated with the request. In examples where the input comprises a user utterance, audio data corresponding to the user utterance may be sent to the remote system. The speech-processing system may generate intent data indicating an intent associated with the user utterance. In the example where the user utterance indicates an intent to output content on the one or more devices, an A/V speechlet may receive the intent data and/or a payload associated with the intent data and may utilize that information to determine what content is to be provided to the primary device for output. An A/V retrieval component may retrieve the requested content and the remote system may send the content to the primary device. The content, in a given example may include image data and audio data. In other examples, the content may include just image data, just audio data, and/or other types of data, such as text data.

At block 806, the process may include receiving second content data associated with the first content data. For example, the audio data may be received from the remote system in the form of audio-data packets and/or the audio data may be received from the remote system, and a primary device may format the audio data into audio-data packets.

At block 808, the process 800 may include determining, based at least in part on the first data, a number of backup packets to be generated, a backup packet of the backup packets representing a data packet corresponding to at least a portion of the second content data. For example, the packet-loss data may be utilized to determine one or more parameters for backup packet generation by the packet generator and/or and packet transmission by the packet-configuration component. For example, the parameters may include a number of backup packets, which may be duplicates of data packets to be transmitted to a given device, to be generated, a type of backup packet to be generated by the packet generator. The type of backup packet may be a full duplicate of a given data packet, a compressed and/or simplified version of a full duplicate of a given data packet, and/or a parity packet.

Additionally, or alternatively, the packet generator may generate parity packets, which may be utilized for adaptive information packet transmission. A parity packet may be generated utilizing two or more data packets and may represent, in a situation where there are two data packets used, either the first packet or the second packet. For example, the parity packet may be generated utilizing forward erasure coding. Forward erasure coding may utilize a forward error correction code that assumes bit erasures. The forward error correction code may transform a message with a certain number of symbols, and/or the data associated with those packets, into a longer message with more symbols such that the original message can be recovered from a subset of those symbols. In these examples, a parity packet may use forward erasure coding on messages from multiple data packets to generate a representation of the messages from both data packets. A parity check and/or polynomial oversampling may be utilized to recover one or more packets that are lost as long as the remaining packets are received along with the parity packet. For example, if a parity packet that represents a first data packet and a second data packet is sent, the first data packet or the second data packet may be recovered utilizing the parity packet when either the first data packet or the second data packet is lost and the parity packet is received. The parity packet may not be utilized to recover a lost packet if both the first data packet and the second data packet are lost. By utilizing parity packets instead of duplicate backup packets, the number of packets sent is decreased, which decreases bandwidth of packet transmission. The number of packets utilized to generate a parity packet may be static and/or may be dynamic and be based at least in part on historical packet-loss data indicating frequency of packet loss and/or a number of consecutive packets historically lost.

At block 810, the process 800 may include determining, based at least in part on the first data, a packet-spacing value indicating when to send the backup packet after sending the data packet. For example, the parameters described with respect to block 806 may also include a packet-spacing value indicating when backup packets are to be sent and/or an order of sending the backup packets in association with the data packets. By way of example, the number of backup packets to be generated and/or sent may be 1, 2, 3, 4, or more backup packets. The packet-spacing value may indicate that a backup packet is to be sent immediately following transmission of the corresponding data packet, one packet after transmission of the data packet, two packets after transmission of the data packet, and/or more than two packets after transmission of the data packet. The order for sending backup packets may indicate when backup packets are to be sent in association with each other.

At block 812, the process 800 may include sending, during a period of time between receiving the first content data and output of first content corresponding to the first content data, the data packet to the device. For example, the data packets may be sent based at least in part on the scheduled sending of data packets and backup packets as described herein.

At block 814, the process 800 may include sending, to the device and during the period of time, the backup packets such that the number of the backup packets are sent utilizing the packet-spacing value.

At block 816, the process 800 may include causing the first content to be output after expiration of the period of time and in a time-synchronous manner with second content corresponding to the data packet or the backup packets as output by the device. For example, once the period of time has lapsed, the display of the primary device may present the images while the audio-output device(s) output the corresponding audio.

Additionally, or alternatively, the process 800 may include receiving, from the device, second data indicating a frequency of packet loss. The process 800 may also include receiving, from the device, third data indicating a number of consecutive lost packets. In other examples, the third data may indicate a quality of a network connected to the device. The process 800 may also include determining to decrease, increase, and/or maintain the number of backup packets based at least in part on at least one of the frequency or the number of consecutive lost packets and/or determining to decrease, increase, and/or maintain the packet-spacing value based at least in part on the frequency or the number of consecutive lost packets.

Additionally, or alternatively, the process 800 may include determining, from the first data, that at least one packet of two consecutive packets is received by the device. The process 800 may also include generating, based at least in part on determining that the at least one packet of the two consecutive packets is received by the device, a parity packet corresponding to a first data packet and a second data packet of the data packets and sending the parity packet to the device instead of at least a portion of the backup packets.

Additionally, or alternatively, the process 800 may include receiving, from the device, second data indicating that a number of lost packets satisfies a threshold number of lost packets. The process 800 may also include removing, based at least in part on the second data, a first portion of the data packets and corresponding backup packets from a packet queue and sending, to the device, a second portion of the data packets instead of the first portion.

Additionally, or alternatively, the process 800 may include receiving, from the audio-output device, feedback data indicating that a number of lost packets satisfies a threshold number of lost packets. The process 800 may also include sending, to the audio-output device and in response to the feedback data, a command to decrease an amount of buffered audio data associated with the audio-output device, the command indicating an event that, upon occurrence of the event, causes the amount of the buffered audio data to decrease, the event including at least one of an indication that a user has provided input, detection of an audio-gap in the audio data, or detection of image data indicating a black screen.

Additionally, or alternatively, the process 800 may include receiving second data indicating packet loss associated with a second device. The process 800 may also include determining that a first device type associated with the first device corresponds to a second device type associated with the second device. In these examples, determining the number of backup packets and/or the packet-spacing value may be based at least in part on the first device type corresponding to the second device type.

Additionally, or alternatively, the process 800 may include receiving image data associated with the data packets and determining a period of time between receiving the image data and causing display of images corresponding to the image data. The process 800 may also include determining that a bandwidth associated with sending the data packets and the backup packets satisfies a threshold bandwidth and causing the period of time to be reduced based at least in part on the bandwidth satisfying the threshold bandwidth.

Additionally, or alternatively, the process 800 may include receiving, from the device, second data indicating a frequency of packet loss and receiving, from the device, third data indicating a number of lost packets during a time period. The process 800 may also include causing a buffer of the device to decrease a number of buffered packets based at least in part on the frequency and the number of lost packets during the time period.

Additionally, or alternatively, the process 800 may include determining, based at least in part on the first data, a first order in which to send the data packets and the backup packets. The process 800 may also include receiving, from the device, second data indicating that a number of lost packets satisfies a threshold number of lost packets and determining, based at least in part on the second data, a second order in which to send the data packets and the backup packets.

Figure 9:
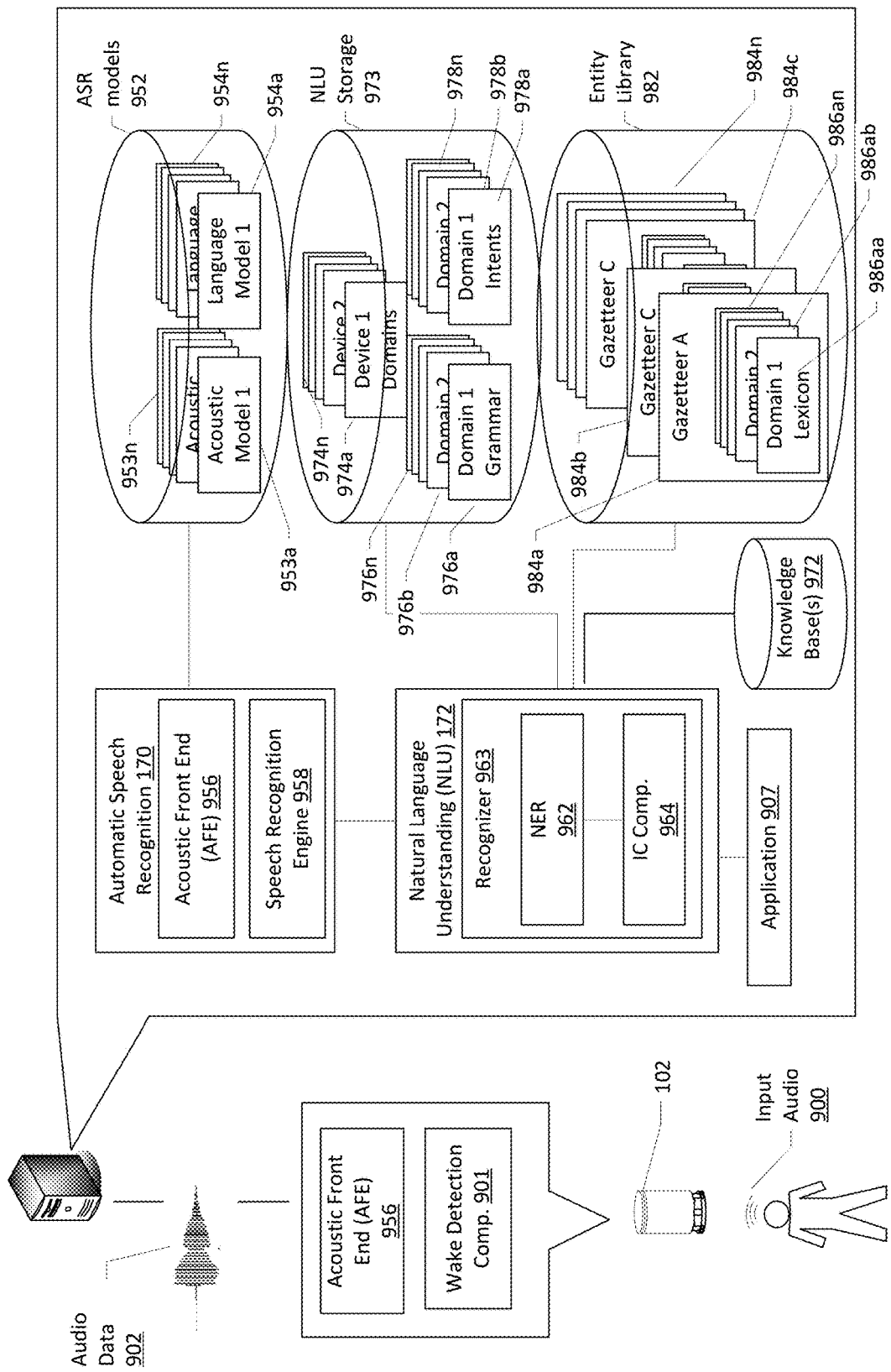
FIG. 9 illustrates a conceptual diagram of components of a speech-processing system for processing audio data provided by one or more devices.

FIG. 9 illustrates a conceptual diagram of how a spoken utterance can be processed, allowing a system to capture and execute commands spoken by a user, such as spoken commands that may follow a wakeword, or trigger expression, (i.e., a predefined word or phrase for "waking" a device, causing the device to begin sending audio data to a remote system, such as system 106). The various components illustrated may be located on a same device or different physical devices. Message between various components illustrated in FIG. 9 may occur directly or across a network 108. An audio capture component, such as a microphone 116 of the device 102, 104(*a*)-(*d*), or another device, captures audio 900 corresponding to a spoken utterance. The device 102, 104(*a*)-(*d*), using a wake-word component 901, then processes audio data corresponding to the audio 900 to determine if a keyword (such as a wakeword) is detected in the audio data. Following detection of a wakeword, the device 102, 104(*a*)-(*d*) sends audio data 902 corresponding to the utterance to the remote system 106 that includes an ASR component 154. The audio data 902 may be output from an optional acoustic front end (AFE) 956 located on the device prior to transmission. In other instances, the audio data 902 may be in a different form for processing by a remote AFE 956, such as the AFE 956 located with the ASR component 154 of the remote system 106.

The wake-word component 901 works in conjunction with other components of the user device, for example a microphone to detect keywords in audio 900. For example, the device may convert audio 900 into audio data, and process the audio data with the wake-word component 901 to determine whether human sound is detected, and if so, if the audio data comprising human sound matches an audio fingerprint and/or model corresponding to a particular keyword.

The user device may use various techniques to determine whether audio data includes human sound. Some embodiments may apply voice activity detection (VAD) techniques. Such techniques may determine whether human sound is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the user device may implement a limited classifier configured to distinguish human sound from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in human sound storage, which acoustic models may include models corresponding to human sound, noise (such as environmental noise or background noise), or silence. Still other techniques may be used to determine whether human sound is present in the audio input.

Once human sound is detected in the audio received by user device (or separately from human sound detection), the user device may use the wake-word component 901 to perform wakeword detection to determine when a user intends to speak a command to the user device. This process may also be referred to as keyword detection, with the wakeword being a specific example of a keyword. Specifically, keyword detection may be performed without performing linguistic analysis, textual analysis or semantic analysis. Instead, incoming audio (or audio data) is analyzed to determine if specific characteristics of the audio match preconfigured acoustic waveforms, audio fingerprints, or other data to determine if the incoming audio "matches" stored audio data corresponding to a keyword.

Thus, the wake-word component 901 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. Tis approach can be extended to include discriminative information by incorporating hybrid DNN-HMM decoding framework. In another embodiment, the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 102, 104(*a*)-(*d*) may "wake" and begin transmitting audio data 902 corresponding to input audio 900 to the remote system 106 for speech processing. Audio data corresponding to that audio may be sent to remote system 106 for routing to a recipient device or may be sent to the remote system 106 for speech processing for interpretation of the included speech (either for purposes of enabling voice-messages and/or for purposes of executing a command in the speech). The audio data 902 may include data corresponding to the wakeword, or the portion of the audio data corresponding to the wakeword may be removed by the local device 102, 104(*a*)-(*d*) prior to sending. Further, a local device may "wake" upon detection of speech/spoken audio above a threshold, as described herein. Upon receipt by the remote system 106, an ASR component 154 may convert the audio data 902 into text. The ASR transcribes audio data into text data representing the words of the speech contained in the audio data 902. The text data may then be used by other components for various purposes, such as executing system commands, inputting data, etc. A spoken utterance in the audio data is input to a processor configured to perform ASR which then interprets the utterance based on the similarity between the utterance and pre-established language models 954 stored in an ASR model knowledge base (ASR Models Storage 952). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 953 stored in an ASR Models Storage 952), and the likelihood that a particular word that matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR process 154 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 956 and a speech recognition engine 958. The acoustic front end (AFE) 956 transforms the audio data from the microphone into data for processing by the speech recognition engine 958. The speech recognition engine 958 compares the speech recognition data with acoustic models 953, language models 954, and other data models and information for recognizing the speech conveyed in the audio data. The AFE 956 may reduce noise in the audio data and divide the digitized audio data into frames representing time intervals for which the AFE 956 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 958 may process the output from the AFE 956 with reference to information stored in speech/model storage (952). Alternatively, post front-end processed data (such as feature vectors) may be received by the device executing ASR processing from another source besides the internal AFE. For example, the user device may process audio data into feature vectors (for example using an on-device AFE 956) and transmit that information to a server across a network for ASR processing. Feature vectors may arrive at the remote system 106 encoded, in which case they may be decoded prior to processing by the processor executing the speech recognition engine 958.

The speech recognition engine 958 attempts to match received feature vectors to language phonemes and words as known in the stored acoustic models 953 and language models 954. The speech recognition engine 958 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc. By way of example, a user utterance may be "Alexa, play Video A?" The wake detection component may identify the wake word, otherwise described as a trigger expression, "Alexa," in the user utterance and may "wake" based on identifying the wake word. Audio data corresponding to the user utterance may be sent to the remote system 106, where the speech recognition engine 958 may identify, determine, and/or generate text data corresponding to the user utterance, here "play Video A."

The speech recognition engine 958 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 958 to other processing components, which may be local to the device performing ASR and/or distributed across the network(s). For example, ASR results in the form of a single textual representation of the speech, an N-best list including multiple hypotheses and respective scores, lattice, etc. may be sent to the remote system 106, for natural language understanding (NLU) processing, such as conversion of the text into commands for execution, either by the user device, by the remote system 106, or by another device (such as a server running a specific application like a search engine, etc.).

The device performing NLU processing 156 (e.g., server 106) may include various components, including potentially dedicated processor(s), memory, storage, etc. As shown in FIG. 9, an NLU component 156 may include a recognizer 963 that includes a named entity recognition (NER) component 962 which is used to identify portions of query text that correspond to a named entity that may be recognizable by the system. A downstream process called named entity resolution links a text portion to a specific entity known to the system. To perform named entity resolution, the system may utilize gazetteer information (984*a*-984*n*) stored in entity library storage 982. The gazetteer information may be used for entity resolution, for example matching ASR results with different entities (such as voice-enabled devices, accessory devices, etc.) Gazetteers may be linked to users (for example a particular gazetteer may be associated with a specific user's device associations), may be linked to certain domains (such as music, shopping, etc.), or may be organized in a variety of other ways.

Generally, the NLU process takes textual input (such as processed from ASR 154 based on the utterance input audio 900) and attempts to make a semantic interpretation of the text. That is, the NLU process determines the meaning behind the text based on the individual words and then implements that meaning. NLU processing 156 interprets a text string to derive an intent or a desired action from the user as well as the pertinent pieces of information in the text that allow a device (e.g., device 102, 104(*a*)-(*d*)) to complete that action. For example, if a spoken utterance is processed using ASR 154 and outputs the text "play Video A" the NLU process may determine that the user intended to have one or more devices display Video A and output audio corresponding to Video A.

The NLU may process several textual inputs related to the same utterance. For example, if the ASR 154 outputs N text segments (as part of an N-best list), the NLU may process all N outputs to obtain NLU results.

As will be discussed further below, the NLU process may be configured to parse and tag to annotate text as part of NLU processing. For example, for the text "play Video A," "play" may be tagged as a command (to display content) and "Video A" may be tagged as the naming identifier of the content to be displayed.

To correctly perform NLU processing of speech input, an NLU process 156 may be configured to determine a "domain" of the utterance so as to determine and narrow down which services offered by the endpoint device (e.g., remote system 106 or the user device) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) component 962 receives a query in the form of ASR results and attempts to identify relevant grammars and lexical information that may be used to construe meaning. To do so, the NLU component 156 may begin by identifying potential domains that may relate to the received query. The NLU storage 973 includes a database of devices (974*a*-974*n*) identifying domains associated with specific devices. For example, the user device may be associated with domains for music, telephony, calendaring, contact lists, and device-specific messages, but not video. In addition, the entity library may include database entries about specific services on a specific device, either indexed by Device ID, User ID, or Household ID, or some other indicator.

In NLU processing, a domain may represent a discrete set of activities having a common theme, such as "banking," "health care," "smart home," "communications," "shopping," "music," "calendaring," etc. As such, each domain may be associated with a particular recognizer 963, language model and/or grammar database (976a-976n), a particular set of intents/actions (978a-978n), and a particular personalized lexicon (986). Each gazetteer (984a-984n) may include domain-indexed lexical information associated with a particular user and/or device. For example, the Gazetteer A (984a) includes domain-index lexical information 986aa to 986an. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both messages and, for example, music, the query may, substantially in parallel, be NLU processed using the grammar models and lexical information for messages, and will be processed using the grammar models and lexical information for music. The responses based on the query produced by each set of models is scored, with the overall highest ranked result from all applied domains ordinarily selected to be the correct result.

An intent classification (IC) component 964 parses the query to determine an intent or intents for each identified domain, where the intent corresponds to the action to be performed that is responsive to the query. Each domain is associated with a database (978a-978n) of words linked to intents. For example, A/V intent database may link words and phrases such as "identify video," "video title," "determine video," to a "content identification" intent. By way of further example, a timer intent database may link words and phrases such as "set," "start," "initiate," and "enable" to a "set timer" intent. A voice-message intent database, meanwhile, may link words and phrases such as "send a message," "send a voice message," "send the following," or the like. The IC component 964 identifies potential intents for each identified domain by comparing words in the query to the words and phrases in the intents database 978. In some instances, the determination of an intent by the IC component 964 is performed using a set of rules or templates that are processed against the incoming text to identify a matching intent.

In order to generate a particular interpreted response, the NER 962 applies the grammar models and lexical information associated with the respective domain to actually recognize a mention of one or more entities in the text of the query. In this manner, the NER 962 identifies "slots" or values (i.e., particular words in query text) that may be needed for later command processing. Depending on the complexity of the NER 962, it may also label each slot with a type of varying levels of specificity (such as noun, place, device name, device location, city, artist name, song name, amount of time, timer number, or the like). Each grammar model 976 includes the names of entities (i.e., nouns) commonly found in speech about the particular domain (i.e., generic terms), whereas the lexical information 986 from the gazetteer 984 is personalized to the user(s) and/or the device. For instance, a grammar model associated with the shopping domain may include a database of words commonly used when people discuss shopping.

The intents identified by the IC component 964 are linked to domain-specific grammar frameworks (included in 976) with "slots" or "fields" to be filled with values. Each slot/field corresponds to a portion of the query text that the system believes corresponds to an entity. To make resolution more flexible, these frameworks would ordinarily not be structured as sentences, but rather based on associating slots with grammatical tags. For example, if "play" is an identified intent, a grammar (976) framework or frameworks may correspond to sentence structures such as "retrieve content with (Video A) identifier."

For example, the NER component 962 may parse the query to identify words as subject, object, verb, preposition, etc., based on grammar rules and/or models, prior to recognizing named entities. The identified verb may be used by the IC component 964 to identify intent, which is then used by the NER component 962 to identify frameworks. A framework for the intent of "play a song," meanwhile, may specify a list of slots/fields applicable to play the identified "song" and any object modifier (e.g., specifying a music collection from which the song should be accessed) or the like. The NER component 962 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER component 962 may search the database of generic words associated with the domain (in the knowledge base 972). So, for instance, if the query was "identify this song," after failing to determine which song is currently being output, the NER component 962 may search the domain vocabulary for songs that have been requested lately. In the alternative, generic words may be checked before the gazetteer information, or both may be tried, potentially producing two different results.

The output data from the NLU processing (which may include tagged text, commands, etc.) may then be sent to an application 907. The destination application 907 may be determined based on the NLU output. For example, if the NLU output includes a command to send a message, the destination application 907 may be a message sending application, such as one located on the user device or in a message sending appliance, configured to execute a message sending command. If the NLU output includes a search request, the destination application 907 may include a search engine processor, such as one located on a search server, configured to execute a search command. After the appropriate command is generated based on the intent of the user, the application 907 may provide some or all of this information to a text-to-speech (TTS) engine. The TTS engine may then generate an actual audio file for outputting the audio data determined by the application 907 (e.g., "okay," or "playing Video A"). After generating the file (or "audio data"), the TTS engine may provide this data back to the remote system 106.

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 156 during runtime operations where NLU operations are performed on text (such as text output from an ASR component 154). Each domain may have specially configured components to perform various steps of the NLU operations.

For example, in a NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 963. Each recognizer may include various NLU components such as an NER component 962, IC component 964 and other components such as an entity resolver, or other components.

For example, a messaging domain recognizer 963-A (Domain A) may have an NER component 962-A that identifies what slots (i.e., portions of input text) may correspond to particular words relevant to that domain. The words may correspond to entities such as (for the messaging domain) a recipient. An NER component 962 may use a machine learning model, such as a domain specific conditional random field (CRF) to both identify the portions corresponding to an entity as well as identify what type of entity corresponds to the text portion. The messaging domain recognizer 963-A may also have its own intent classification (IC) component 964-A that determines the intent of the text assuming that the text is within the proscribed domain. An IC component may use a model, such as a domain specific maximum entropy classifier to identify the intent of the text, where the intent is the action the user desires the system to perform. For this purpose, the remote system computing device 106 may include a model training component. The model training component may be used to train the classifier(s)/machine learning models discussed above.

As noted above, multiple devices may be employed in a single speech-processing system. In such a multi-device system, each of the devices may include different components for performing different aspects of the speech processing. The multiple devices may include overlapping components. The components of the user device and the remote system 106, as illustrated herein are exemplary, and may be located in a stand-alone device or may be included, in whole or in part, as a component of a larger device or system, may be distributed across a network or multiple devices connected by a network, etc.

Figure 10:
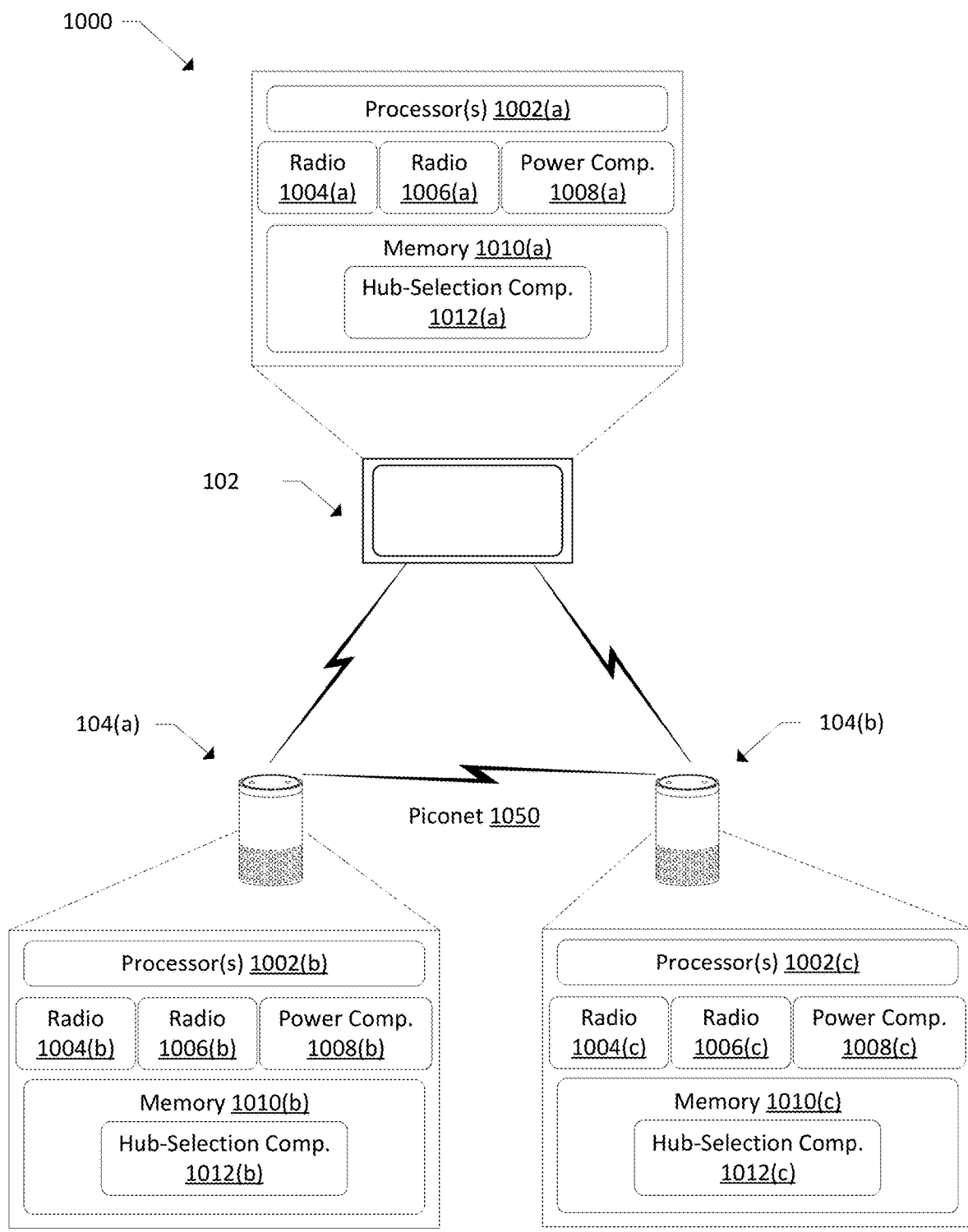
FIG. 10 illustrates example components of example devices utilized for selection of a primary device and one or more secondary devices.

FIG. 10 illustrates example components of example devices utilized for selection of a primary device and secondary devices. As illustrated, a device, also described as a computing device and/or a voice-enabled device and/or a personal device, includes one or more processors 1002(a), 1002(b), and 1002(c), a respective first radio component 1004(a), 1004(b), and 1004(c) for communicating over a wireless network (e.g., LAN, WAN, etc.), and a respective second radio component 1006(a), 1006(b), and 1006(c) for communicating over a short-range wireless connection. In some instances, each device 104(a)-(c) may include a single radio unit to communicate over multiple protocols (e.g., Bluetooth and BLE), two or more radio units to communicate over two or more protocols, or the like. As used herein, a "radio" and "radio component" may be used interchangeably. Again, in some instances, the devices include any other number of radios, including instances where the devices comprise a single radio configured to communicate over two or more different protocols.

In addition, each device may include a respective power component 1008(a), 1008(b), and 1008(c). In examples, one or more of the power components may include a battery. In other examples, one or more of the power components may include a plug and/or other device configured to be plugged into an outlet that provides power. At any given time, each power component may have a particular battery life or level, representing a current charge of the battery. The battery life or level may be measured in any suitable manner, such as by a percentage of charge remaining, an amount of time remaining, or the like. While the techniques described herein are described with reference to devices powered by batteries, it is to be appreciated that the techniques may also apply to devices that receive constant power.

In addition to the above, the devices 104(a)-(c) may include respective memory (or "computer-readable media") 1010(a), 1010(b), and 1010(c), which may store respective instances of a hub-selection component 1012(a), 1012(b), and 1012(c). The hub-selection components 1012(a)-(c) may generate messages (e.g., battery-life messages, communication-strength messages, etc.) and one or more maps (e.g., battery-life maps, communication-strength maps, etc.), and may be used to select/determine the hub device, also described herein as the primary device and/or the master device to perform a given functionality. Further, the hub-selection components 1012(a)-(c) may send and/or receive the hub-selection messages and store an indication of the selected hub and the amount of time for which the selected device is to act as the hub. The hub-selection components 1012(a)-(c) may also set a timer for determining the amount of time for which the selected device is to act as a hub, or may otherwise determine when the time for the device to act as the hub has elapsed, such as upon the occurrence of a triggering event as described more fully herein. The hub-selection components 1012(a)-(c) may utilize data from a remote system, as described more fully above with respect to FIG. 1, for example. For example, the remote system may determine that one of the devices is to be identified as the primary device for a given functionality while the other devices are to be identified as the secondary devices for the functionality. Based at least in part on this determination, the remote system may be configured to send data and/or an instruction to the hub-selection component(s) 1012(a)-(c) to select the primary device and send one or more messages between or among the devices to cause the functionality to be disabled with respect to the secondary devices.

In some instances, messages sent by each device indicate a current battery level of the device (also referred to as a "battery level value"), a current connection strength to the WLAN of the device, information identifying the WLAN, information identifying the device, capability data as described herein, and/or the like. With this information, each hub-selection component 1012(a)-(c) may determine the device that is to be selected as the hub device. In some instances, the hub-selection components 1012(a)-(c) may implement an algorithm that selects the device based at least in part on device usage data, audio signal strength, user detection information, and/or other data as described herein. In still other instances, each component is configured to implement a cost function that selects the communication hub based on one or more weighted factors, such as current battery levels, connection strengths, types of data being provided by the remote system, and so forth. In other examples, one of the devices may be designated by the user as the hub and/or one of the device may include additional components and/or functionality and may be designed as the hub based at least in part on those additional components and/or functionality.

The devices 102, 104(a)-(b) may couple with one another over a short-range wireless network and thus collectively form a piconet 1050. In the illustrated example, each of the devices comprise devices configured to communicate both with one another over a short-range connection as well as over a network 108. In some instances, meanwhile, while the primary device may be configured to communicate over a short-range wireless network and over the network 108, or the secondary devices may be configured to communicate over multiple short-range wireless protocols (e.g., Bluetooth, BLE, etc.) while being incapable of communicating over the network 108. In these instances, the devices 102, 104(a)-(b) may select a hub that communicates with the other devices over a low-power protocol while communicating with the primary device over a higher-power protocol. The primary device may then communicate these messages over the network 108.

Figure 11:
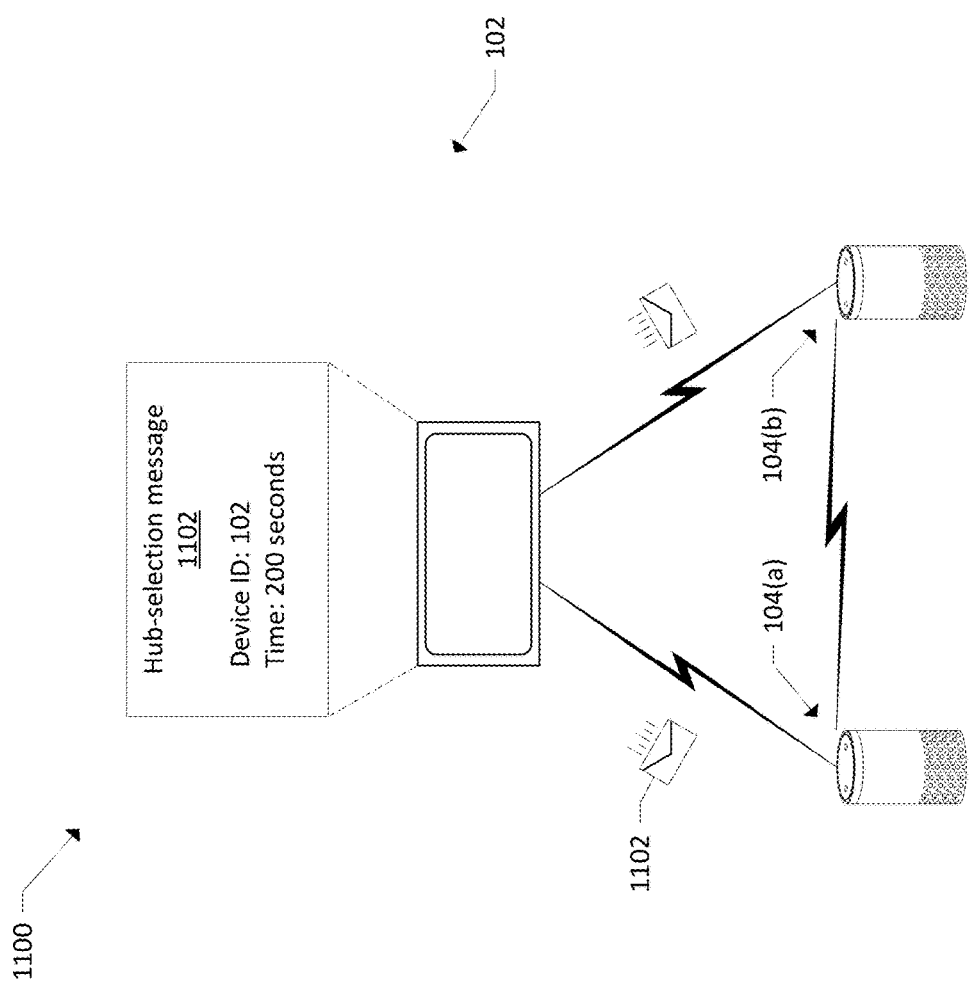
FIG. 11 illustrates an example primary-device selection message that one of the devices in an environment may send to the other devices in response to determining that one device is to act as the primary device.

FIG. 11 illustrates an example hub-selection message that one of the devices in an environment may send to the other devices in response to the device determining that it is to act as the hub device. While FIG. 11 illustrates the selected hub sending this message 1102, in this case the device 102, in other instances one or more other devices may send this message 1102. For instance, one or more of the non-hub devices, otherwise described as the secondary devices, may send this message and/or a remote system may send this message. As illustrated, the hub-selection message may indicate the device identification (DID) of the selected hub device, in this example, the DID of the first device 102, as well as the amount of time for which the selected device is to act as the hub device. In examples, this amount of time may be preconfigured and constant, while in other instances it may vary depending on the occurrence of a triggering event as described herein, the number of devices in the piconet, or the like. In response to receiving the hub-selection message 1102, the non-hub devices may store an indication of the DID of the hub as well as the amount of time for which the selected device is to act as the hub device. The devices may then again send out messages after expiration of the amount of time or just prior to expiration of this amount of time to determine if the hub device should change.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A system, comprising:
one or more processors; and
non-transitory computer-readable media storing computer-executable instructions that, when executed by the one or more processors, cause the one or more processors to perform operations comprising:
receiving packet-loss data indicating historical packet loss associated with an audio-output device;
receiving image data from a remote system;
receiving, from the remote system, audio data associated with the image data;
determining, utilizing the packet-loss data, a number of backup packets to be generated, a backup packet of the backup packets corresponding to a representation of an audio-data packet corresponding to at least a portion of the audio data;
determining, utilizing the packet-loss data, a packet-spacing value indicating when to send the backup packet after sending the audio-data packet that corresponds to the backup packet;
determining a period of time between receiving the image data and causing display of images corresponding to the image data;
sending, during the period of time, the audio-data packet to the audio-output device;
sending, to the audio-output device and during the period of time, the backup packets such that the number of the backup packets are sent utilizing the packet-spacing value; and
causing the images to be displayed after expiration of the period of time and in a time-synchronous manner with audio corresponding to the audio-data packet or the backup packets as output by the audio-output device.

2. The system of claim 1, the operations further comprising:
receiving, from the audio-output device, first data indicating a number of audio-data packets that are not received by the audio-output device during the period of time;
receiving, from the audio-output device, second data indicating a number of consecutive lost packets;
determining to increase the number of backup packets from the number of the audio-data packets that are not received by the audio-output device during the period of time and the number of consecutive lost packets; and
determining to increase the packet-spacing value from the number of the audio-data packets that are not received by the audio-output device satisfying a threshold number of the audio-data packets and the number of consecutive lost packets satisfying a threshold number of consecutive lost packets.

3. The system of claim 1, the operations further comprising:
determining, from the packet-loss data, that at least one packet of two consecutive packets is received by the audio-output device;
generating, in response to determining that the at least one packet of the two consecutive packets is received by the audio-output device, a parity packet corresponding to a second audio-data packet and a third audio-data packet; and
sending the parity packet to the audio-output device instead of at least a portion of the backup packets.

4. The system of claim 1, the operations further comprising:
- receiving, from the audio-output device, feedback data indicating that a number of lost packets satisfies a threshold number of lost packets; and
- sending, to the audio-output device and in response to the feedback data, a command to increase an amount of buffered audio data associated with the audio-output device, the command indicating an event that, upon occurrence of the event, causes the amount of the buffered audio data to decrease.

5. A method, comprising:
- receiving first data indicating packet loss associated with a device;
- receiving first content data;
- receiving second content data associated with the first content data;
- determining, based at least in part on the first data, a number of backup packets to be generated, a backup packet of the backup packets representing a data packet corresponding to at least a portion of the second content data;
- determining, based at least in part on the first data, a packet-spacing value indicating when to send the backup packet after sending the data packet;
- sending, during a period of time between receiving the first content data and output of first content corresponding to the first content data, the data packet to the device;
- sending, to the device and during the period of time, the backup packets such that the number of the backup packets are sent utilizing the packet-spacing value; and
- causing the first content to be output after expiration of the period of time and in a time-synchronous manner with second content corresponding to the data packet or the backup packets as output by the device.

6. The method of claim 5, further comprising:
- receiving, from the device, second data indicating a frequency of packet loss;
- receiving, from the device, third data indicating a number of consecutive lost packets;
- determining to increase the number of backup packets based at least in part on at least one of the frequency or the number of consecutive lost packets; and
- determining to increase the packet-spacing value based at least in part on the frequency or the number of consecutive lost packets.

7. The method of claim 5, further comprising:
- determining, from the first data, that at least one packet of two consecutive packets is received by the device;
- generating, based at least in part on determining that the at least one packet of the two consecutive packets is received by the device, a parity packet corresponding to a first data packet and a second data packet of the data packets; and
- sending the parity packet to the device instead of at least a portion of the backup packets.

8. The method of claim 5, further comprising:
- receiving, from the device, feedback data indicating that a number of lost packets satisfies a threshold number of lost packets; and
- sending, to the device and based at least in part on the feedback data, a command to increase an amount of buffered data packets associated with the device, the command indicating an event that, upon occurrence of the event, causes the amount of the buffered data packets to decrease.

9. The method of claim 5, wherein the device comprises a first device, and the method further comprises:
- receiving second data indicating packet loss associated with a second device;
- determining that a first device type associated with the first device corresponds to a second device type associated with the second device;
- wherein determining the number of the backup packets comprises determining, based at least in part on the first device type corresponding to the second device type, the number of the backup packets utilizing the second data; and
- wherein determining the packet-spacing value comprises determining, based at least in part on the first device type corresponding to the second device type, the packet-spacing value utilizing the second data.

10. The method of claim 5, further comprising:
- determining that a bandwidth associated with sending the data packets and the backup packets satisfies a threshold bandwidth; and
- causing the period of time to be reduced based at least in part on the bandwidth satisfying the threshold bandwidth.

11. The method of claim 5, further comprising:
- receiving, from the device, second data indicating a frequency of packet loss;
- receiving, from the device, third data indicating a number of lost packets during a time period; and
- causing a buffer of the device to decrease a number of buffered packets based at least in part on the frequency and the number of lost packets during the time period.

12. The method of claim 5, further comprising:
- determining, based at least in part on the first data, a first order in which to send the data packets and the backup packets;
- receiving, from the device, second data indicating that a number of lost packets satisfies a threshold number of lost packets; and
- determining, based at least in part on the second data, a second order in which to send the data packets and the backup packets.

13. A system, comprising:
- one or more processors; and
- non-transitory computer-readable media storing computer-executable instructions that, when executed by the one or more processors, cause the one or more processors to perform operations comprising:
  - receiving first data indicating packet loss associated with a device;
  - receiving first content data;
  - receiving second content data associated with the first content data;
  - determining, based at least in part on the first data, a number of backup packets to be generated, a backup packet of the backup packets corresponding to a representation of a data packet corresponding to at least a portion of the second content data;
  - determining, based at least in part on the first data, a packet-spacing value indicating when to send the backup packet after sending the data packet that corresponds to the backup packet;
  - sending, during a period of time between receiving the first content data and output of first content corresponding to the first content data, the data packet to the device;

sending, to the device and during the period of time, the backup packets such that the number of the backup packets are sent utilizing the packet-spacing value; and causing the first content to be output after expiration of the period of time and in a time-synchronous manner with second content corresponding to the data packet or the backup packets as output by the device.

14. The system of claim 13, the operations further comprising:

receiving, from the device, second data indicating a quality of a network connection with the device;

determining to increase the number of backup packets based at least in part on the second data; and determining to increase the packet-spacing value based at least in part on the second data.

15. The system of claim 13, the operations further comprising:

determining, from the first data, that at least one packet of two consecutive packets is received by the device;

generating, based at least in part on determining that the at least one packet of the two consecutive packets is received by the device, a parity packet corresponding to a first data packet and a second data packet of the data packets; and sending the parity packet to the device instead of at least a portion of the backup packets.

16. The system of claim 13, the operations further comprising:

receiving, from the device, feedback data indicating that a number of lost packets satisfies a threshold number of lost packets; and sending, to the device and based at least in part on the feedback data, a command to decrease an amount of buffered data packets associated with the device, the command indicating an event that, upon occurrence of the event, causes the amount of the buffered data packets to decrease.

17. The system of claim 13, wherein the device comprises a first device, and the operations further comprise:

receiving second data indicating packet loss associated with a second device;

determining that a first device type associated with the first device corresponds to a second device type associated with the second device;

wherein determining the number of the backup packets comprises determining, based at least in part on the first device type corresponding to the second device type, the number of the backup packets utilizing the second data; and wherein determining the packet-spacing value comprises determining, based at least in part on the first device type corresponding to the second device type, the packet-spacing value utilizing the second data.

18. The system of claim 13, the operations further comprising:

determining that a bandwidth associated with sending the data packets and the backup packets satisfies a threshold bandwidth; and causing the period of time to be reduced based at least in part on the bandwidth satisfying the threshold bandwidth.

19. The system of claim 13, the operations further comprising:

receiving, from the device, second data indicating a frequency of packet loss;

receiving, from the device, third data indicating a number of lost packets during a time period; and causing a buffer of the device to decrease a number of buffered packets based at least in part on the frequency and the number of lost packets during the time period.

20. The system of claim 13, the operations further comprising:

determining, based at least in part on the first data, a first order in which to send the data packets and the backup packets;

receiving, from the device, second data indicating that a number of lost packets satisfies a threshold number of lost packets; and determining, based at least in part on the second data, a second order in which to send the data packets and the backup packets.

* * * * *